(12) United States Patent
Hirohata et al.

(10) Patent No.: US 8,200,061 B2
(45) Date of Patent: Jun. 12, 2012

(54) SIGNAL PROCESSING APPARATUS AND METHOD THEREOF

(75) Inventors: Makoto Hirohata, Kanagawa (JP); Kazunori Imoto, Kanagawa (JP); Yoshihiro Ohmori, Kanagawa (JP); Hisashi Aoki, Kanagawa (JP); Tatsuya Uehara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1048 days.

(21) Appl. No.: 12/073,046

(22) Filed: Feb. 28, 2008

(65) Prior Publication Data
US 2009/0067807 A1 Mar. 12, 2009

(30) Foreign Application Priority Data
Sep. 12, 2007 (JP) .................................. 2007-236619

(51) Int. Cl.
*H04N 9/80* (2006.01)
(52) U.S. Cl. .......... 386/52; 386/239; 386/241; 386/242; 386/248; 386/249; 386/250
(58) Field of Classification Search .................... 386/52, 386/117, 241–242, 249–250
See application file for complete search history.

(56) References Cited

U.S. PATENT DOCUMENTS

| | | | |
|---|---|---|---|
| 5,742,928 A | 4/1998 | Suzuki | |
| 5,864,809 A | 1/1999 | Suzuki | |
| 6,023,520 A | 2/2000 | Nagasaka et al. | |
| 6,119,084 A | 9/2000 | Roberts et al. | |
| 6,185,527 B1 | 2/2001 | Petkovic et al. | |
| 6,317,711 B1 | 11/2001 | Muroi | |
| 6,404,925 B1 * | 6/2002 | Foote et al. | 382/224 |
| 6,434,520 B1 | 8/2002 | Kanevsky et al. | |
| 6,466,731 B2 | 10/2002 | Aoki et al. | |
| 6,542,869 B1 | 4/2003 | Foote | |
| 6,577,999 B1 | 6/2003 | Lewis et al. | |
| 6,710,822 B1 | 3/2004 | Walker et al. | |
| 6,751,354 B2 * | 6/2004 | Foote et al. | 382/224 |
| 6,754,389 B1 | 6/2004 | Dimitrova et al. | |
| 6,795,127 B1 | 9/2004 | Hori et al. | |
| 6,801,895 B1 * | 10/2004 | Huang et al. | 704/270 |

(Continued)

FOREIGN PATENT DOCUMENTS
JP 04-084197 3/1992
(Continued)

OTHER PUBLICATIONS

Akita et al.: "Unsupervised Speaker Indexing using Anchor Models and Automatic Transcription of Discussions," ISCA $8^{th}$ European Conf. Speech Communication and Technology (Eurospeech), Sep. 2003.

(Continued)

*Primary Examiner* — Carl Colin
*Assistant Examiner* — John Elmore
(74) *Attorney, Agent, or Firm* — Nixon & Vanderhye, P.C.

(57) ABSTRACT

A signal processing unit includes a feature quantity extracting unit, a segmentalizing unit, a clustering unit, an existence probability function deriving unit, an existence probability function similarity calculating unit, a cluster integrating unit and a cluster information output unit. The signal processing unit classifies the signal feature quantity which characterizes the content signal segmentalized into segments according to the similarity with respect to each other, obtains functions which indicate the existence probabilities for clusters of classified segments, and integrates the clusters whose obtained functions are at the high level of similarity.

17 Claims, 26 Drawing Sheets

U.S. PATENT DOCUMENTS

| | | | |
|---|---|---|---|
| 6,807,306 B1 | 10/2004 | Girgensohn et al. | |
| 6,928,233 B1* | 8/2005 | Walker et al. | 386/241 |
| 6,961,703 B1 | 11/2005 | Higgins et al. | |
| 7,016,540 B1* | 3/2006 | Gong et al. | 382/225 |
| 7,065,487 B2 | 6/2006 | Miyazawa | |
| 7,296,231 B2* | 11/2007 | Loui et al. | 715/723 |
| 7,396,990 B2 | 7/2008 | Lu et al. | |
| 7,778,470 B2 | 8/2010 | Aoki | |
| 7,783,106 B2* | 8/2010 | Cooper et al. | 382/173 |
| 2002/0046024 A1 | 4/2002 | Kompe et al. | |
| 2003/0122861 A1 | 7/2003 | Jun et al. | |
| 2003/0216918 A1 | 11/2003 | Toyama et al. | |
| 2004/0161154 A1 | 8/2004 | Hua et al. | |
| 2004/0249650 A1 | 12/2004 | Freedman et al. | |
| 2005/0075875 A1 | 4/2005 | Shozakai et al. | |
| 2005/0089224 A1* | 4/2005 | Aoki | 382/173 |
| 2006/0058998 A1 | 3/2006 | Yamamoto et al. | |
| 2006/0101065 A1 | 5/2006 | Tsutsui et al. | |
| 2006/0129401 A1 | 6/2006 | Smith et al. | |
| 2006/0241948 A1 | 10/2006 | Abrash et al. | |
| 2007/0033042 A1 | 2/2007 | Marcheret et al. | |
| 2008/0312926 A1 | 12/2008 | Vair et al. | |

FOREIGN PATENT DOCUMENTS

| | | |
|---|---|---|
| JP | 04-332000 | 11/1992 |
| JP | 06-012090 | 1/1994 |
| JP | 07-193748 | 7/1995 |
| JP | 08-054891 | 2/1996 |
| JP | 09-044639 | 2/1997 |
| JP | 9-939588 | 4/1997 |
| JP | 09-270006 | 10/1997 |
| JP | 11-266449 | 9/1999 |
| JP | 2001-147697 | 5/2001 |
| JP | 2001-290494 | 10/2001 |
| JP | 2005-130416 | 5/2005 |
| JP | 2006-084875 | 3/2006 |
| WO | 00/48397 | 8/2000 |

OTHER PUBLICATIONS

U.S. Appl. No. 12/007,379, filed Jan. 9, 2008.

Office Action dated Sep. 6, 2011 in JP Application No. 2007-236619 with English language translation.

Uchihashi et al., Video Manga: Generating Semantically Meaningful Video Summaries, Oct. 1999, ACM Multimedia, 383-392.

Delacourt et al., "DISTBIC: a speaker based segmentation for audio data indexing", Speech Communication, 2000, pp. 111-126.

Li et al., "SVM-Based Audio Classification for Instructional Video Analysis", IEEE-ICASSP, 2004, pp. 897-900.

Moh et al., "Towards Domain Independent Speaker Clustering," Proc. IEEE-1CASSP, vol. 2, (2003), pp. II-85-II-88.

* cited by examiner

FIG. 5

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | TIME INSTANT |
|---|---|---|---|---|---|---|---|---|---|---|---|---|---|---|---|---|---|---|---|---|---|---|---|---|---|---|
| | A | D | A | D | A | D | A | D | B | C | B | C | B | C | B | D | A | D | A | D | D | A | A | D | | |

| SEGMENT NO. | TIME INSTANT INFORMATION | IDENTIFIER OF CLASS BELONGING TO |
|---|---|---|
| 1 | [0, 1) | A |
| 2 | [1, 3) | D |
| 3 | [3, 4) | A |
| 4 | [4, 5) | D |
| 5 | [5, 7) | A |
| 6 | [7, 8) | D |
| 7 | [8, 10) | B |
| 8 | [10, 11) | C |
| 9 | [11, 13) | B |
| 10 | [13, 14) | C |
| 11 | [14, 15) | B |
| 12 | [15, 17) | D |
| 13 | [17, 18) | A |
| 14 | [18, 21) | D |
| 15 | [21, 23) | A |
| 16 | [23, 24) | D |

| IDENTIFIER OF CLASS | ACCUMULATED SEGMENT LENGTH | NUMBER OF SEGMENT |
|---|---|---|
| A | 7 | 5 |
| B | 5 | 3 |
| C | 2 | 2 |
| D | 10 | 6 |

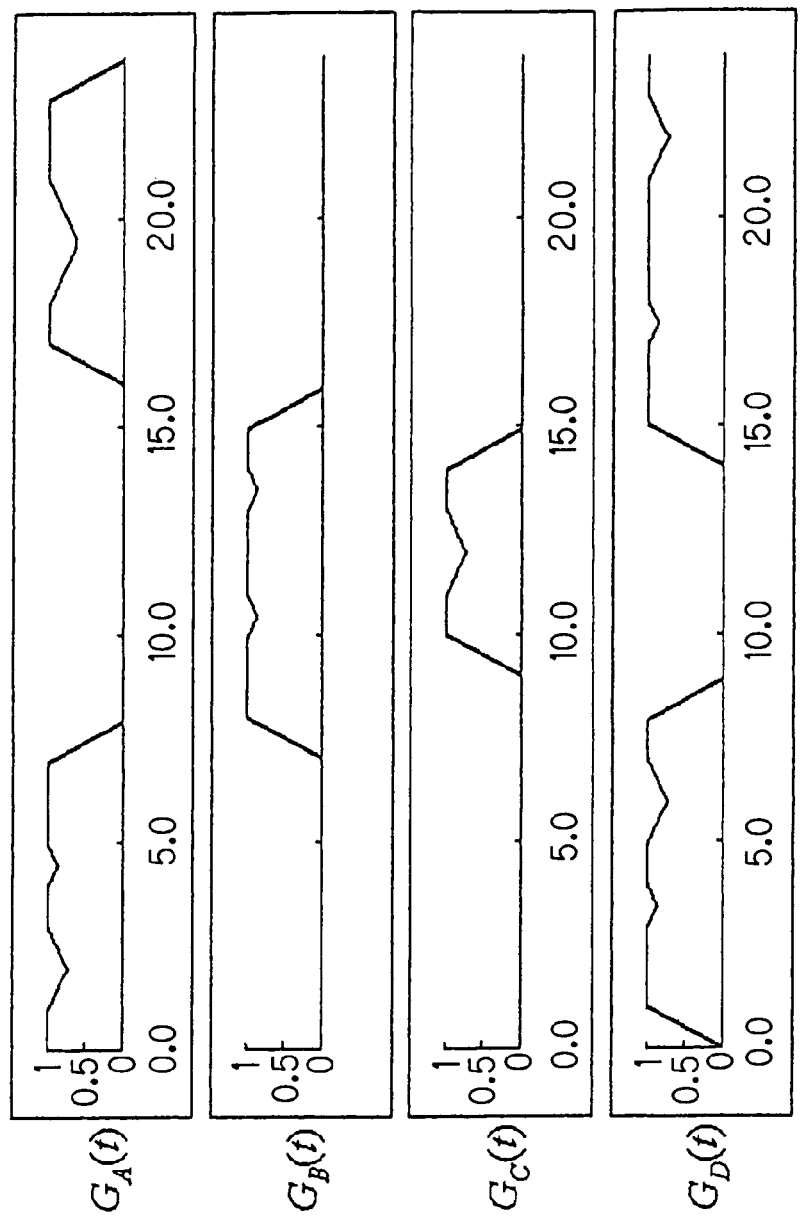

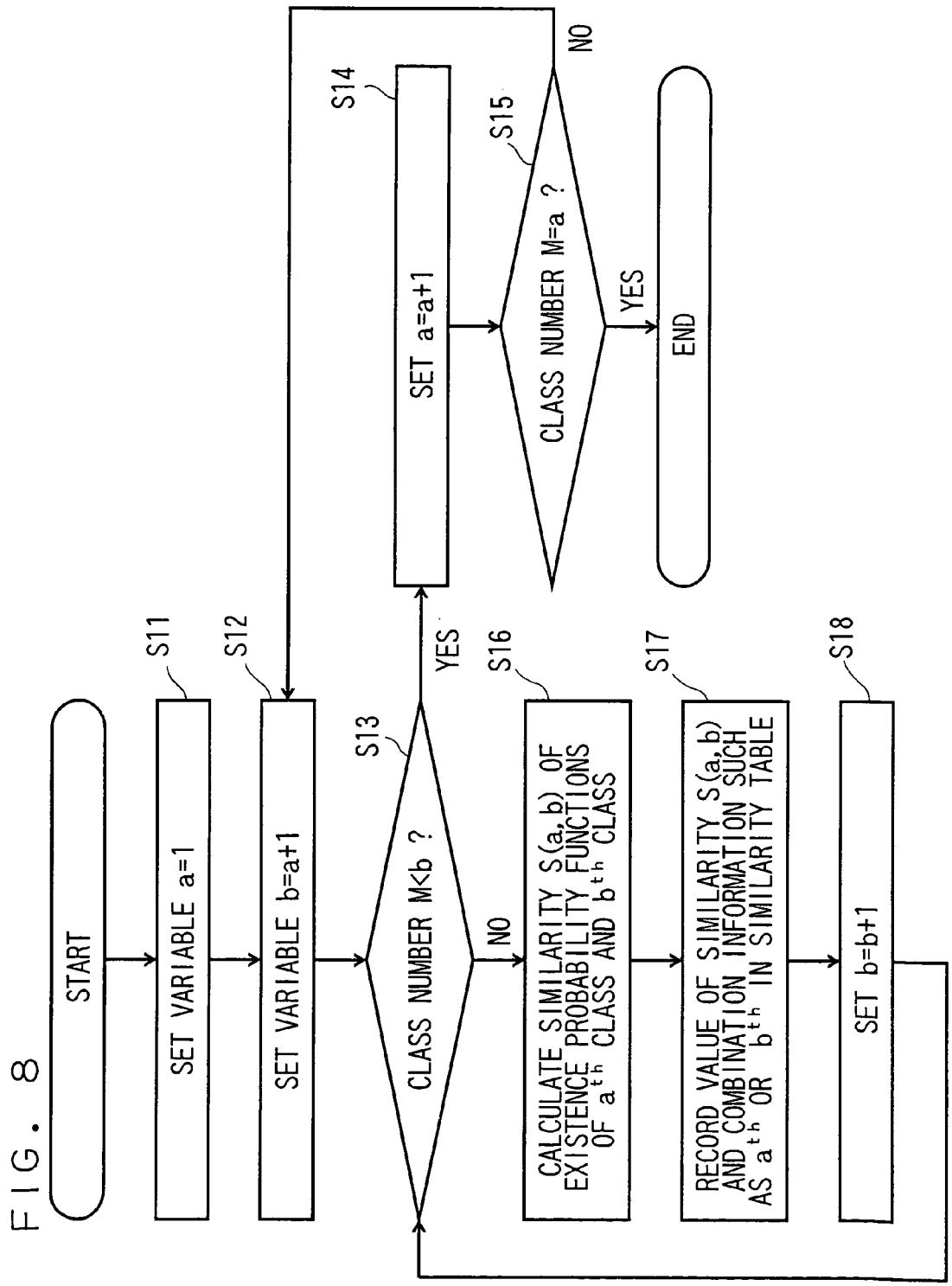

FIG. 9A

| | First Class CLASS A (IDENTIFIER A) | Second Class CLASS B (IDENTIFIER B) | Third Class CLASS C (IDENTIFIER C) | Fourth Class CLASS D (IDENTIFIER D) | SIMILARITY OF EXISTENCE PROBABILITY FUNCTIONS BETWEEN CLASS A AND CLASS D |
|---|---|---|---|---|---|
| CLASS A (IDENTIFIER A) | / | 0.142 | 0.026 | 0.789 | |
| CLASS B (IDENTIFIER B) | / | / | 0.766 | 0.331 | |
| CLASS C (IDENTIFIER C) | / | / | / | 0.184 | |
| CLASS D (IDENTIFIER D) | / | / | / | / | |

FIG. 9B

|  | FIRST CLASS<br>CLASS A<br>(IDENTIFIER A) | SECOND CLASS<br>CLASS B<br>(IDENTIFIER B) | THIRD CLASS<br>CLASS C<br>(IDENTIFIER C) | FOURTH CLASS<br>CLASS D<br>(IDENTIFIER D) |
|---|---|---|---|---|
| CLASS A (IDENTIFIER A) | | 0.020 | 0.000 | 0.818 |
| CLASS B (IDENTIFIER B) | | | 0.772 | 0.170 |
| CLASS C (IDENTIFIER C) | | | | 0.028 |
| CLASS D (IDENTIFIER D) | | | | |

FIG. 9C

| | FIRST CLASS<br>CLASS A<br>(IDENTIFIER A) | SECOND CLASS<br>CLASS B<br>(IDENTIFIER B) | THIRD CLASS<br>CLASS C<br>(IDENTIFIER C) | FOURTH CLASS<br>CLASS D<br>(IDENTIFIER D) |
|---|---|---|---|---|
| CLASS A (IDENTIFIER A) | | 0.025 | 0.008 | 0.516 |
| CLASS B (IDENTIFIER B) | | | 0.626 | 0.081 |
| CLASS C (IDENTIFIER C) | | | | 0.057 |
| CLASS D (IDENTIFIER D) | | | | |

FIG.11B
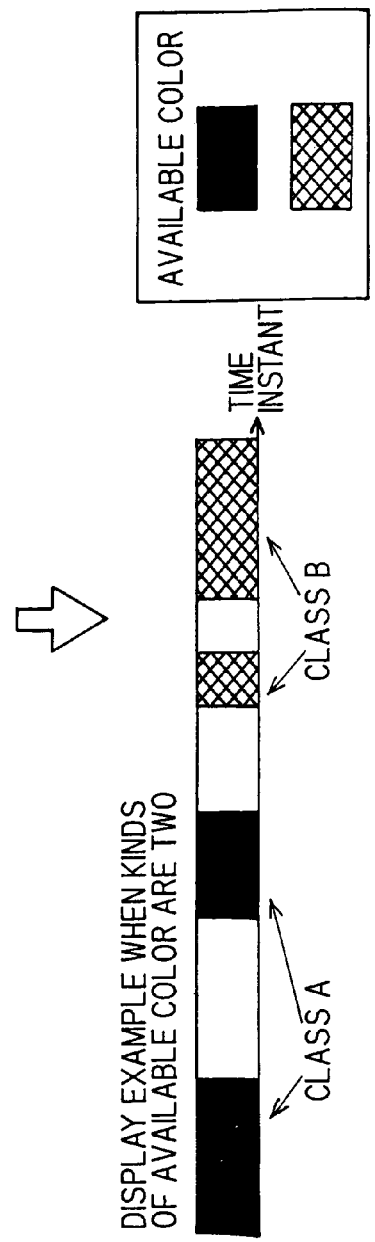

FIG. 16

| | FIRST CLASS<br>CLASS A<br>(IDENTIFIER A) | SECOND CLASS<br>CLASS B<br>(IDENTIFIER B) | THIRD CLASS<br>CLASS C<br>(IDENTIFIER C) | FOURTH CLASS<br>CLASS D<br>(IDENTIFIER D) | FIFTH CLASS<br>CLASS E<br>(IDENTIFIER E) |
|---|---|---|---|---|---|
| CLASS A (IDENTIFIER A) | | 0.142 | 0.026 | 0.742 | 0.646 |
| CLASS B (IDENTIFIER B) | | | 0.766 | 0.021 | 0.373 |
| CLASS C (IDENTIFIER C) | | | | 0.000 | 0.200 |
| CLASS D (IDENTIFIER D) | | | | | 0.529 |
| CLASS E (IDENTIFIER E) | | | | | |

ND METHOD THEREOF

SIGNAL PROCESSING APPARATUS AND METHOD THEREOF

CROSS-REFERENCE TO RELATED APPLICATIONS

This application is based upon and claims the benefit of priority from the prior Japanese Patent Application No. 2007-236619, filed on Sep. 12, 2007; the entire contents of which are incorporated herein by reference.

TECHNICAL FIELD

The present invention relates to a signal processing apparatus which is capable of indexing a video for enhancing convenience when reproducing content signals to view and listen and a method of the same.

BACKGROUND OF THE INVENTION

When a user reproduces a video content, and views and listens to the same, it is important to index the video to enhance convenience, and hence a technology which enables identification of time instants of corner boundaries or corners is required.

In the video indexing, the method shown below is considered. First of all, the video image is divided into video image segments which is referred to as "shot" at timings when a scene is switched to another scene taken by another camera (when the camera angle is changed) and timings when persons, substances or scenes in the video are changed as break points. Then, similar shots are put together into one group, and information on the kinds of shots which appear and the timings when the shots appear is presented to the user.

Here, assuming that the kinds of the shots appeared are different before and after the corner boundaries, estimation of the time instants of the corner boundaries is enabled from the presented shot information and furthermore, recognition of similar corners is enabled the kinds of shots which constitute the corners.

A method of presenting a plurality of shots included in the same corner all together is also considered. In JP-A-2005-130416, a method of processing the tendency of appearance of shots in time series in order to determine the range of shots to be clustered is described.

On the other hand, in the audio indexing, processing is carried out by the unit of utterance divided at moments when the speaker (sound) is switched. Therefore, assuming that the kinds (speaking person, configuration of casts) of utterance appeared are different before and after the corner boundaries, estimation of the time instants of the corner boundaries and recognition of the similar corners are enabled by using the utterance information in the same manner as the case of using the shot information.

However, under the circumstance in which the information on the kinds of shots which appear and the timings when the shots appear is presented to the user, when the number of kinds is increased, the user needs to confirm disappearance of a lot more kinds of shots in the time series and estimate the time instants of corner boundaries of the same.

The user also needs to confirm appearance of a lot more kinds of shots among the corners to determine whether they are similar corners or not.

In the case of putting a plurality of shots included in the same corner together on the basis of the tendency of appearance of shots, when the number of kinds is increased, the user needs to realize the states of appearance for a lot more kinds of shots. Therefore, the information on the possibility of appearance is hidden depending on the kind of the shot. The hidden shot information may contribute to the continuity of the corners, which may result in detection of wrong time instants as the corner boundaries.

Therefore, the more the kinds of the shots/utterances are, the more the understanding of the tendency of appearance become difficult, and hence the estimation of the time instants of the corner boundaries and determination whether or not they are similar corners are liable to err.

BRIEF SUMMARY OF THE INVENTION

In view of the problem shown above, it is an object of the invention to provide a signal processing apparatus which achieves easy realization of time instants of the corner boundaries and recognition of similar corners, and a method of the same.

According to embodiments of the invention, there is provided a signal processing apparatus including a segmentalizing unit configured to segmentalize a signal feature quantity which indicates the feature of a content signal into segments having a given time length, a clustering unit configured to cluster the segments corresponding to the signal feature quantity having high level of similarity into a class on the basis of the similarity among the signal feature quantities corresponding to the respective segments, a function deriving unit configured to obtain existence probability functions indicating probabilities that the respective segments exist with respect to an elapsed time period of the content signal for the segments belonging to the respective classes, a similarity calculating unit configured to calculate similarities among the existence probability functions in the respective classes, an integrating unit configured to obtain integrated classes by integrating classes having the existence probability functions with the high level of similarity, and an output unit configured to output identification information on the integrated classes which the respective segments belong to.

According to the embodiments of the invention, since the classes having the existence probability functions with the high level of similarity in the content signal are integrated, shots/utterances having different classes which occur simultaneously in the same corner may be clustered.

BRIEF DESCRIPTION OF THE DRAWINGS

FIG. 5 illustrates an example of operation relating to a result of clustering carried out by a clustering unit;

FIG. 7B illustrates an example of operation relating to deriving of the existence probability functions carried out by the existence probability function deriving unit;

FIG. 8 is a flowchart showing a procedure of operation of an existence probability function similarity calculating unit;

FIG. 9A illustrates an example of operation relating to a similarity table of the existence probability function similarity calculating unit;

FIG. 9B is an example of operation relating to the similarity table of the existence probability function similarity calculating unit;

FIG. 9C is an example of operation relating to the similarity table of the existence probability function similarity calculating unit;

FIG. 11B is an example of operation relating to the output result of the cluster information output unit;

FIG. 16 illustrates an example of operation relating to the similarity table of the existence probability function similarity calculating unit;

DETAILED DESCRIPTION OF THE INVENTION

Referring now to the attached drawings, a signal processing apparatus 100 according to embodiments of the invention will be described.

First Embodiment

Referring now FIG. 1 to FIG. 18, the signal processing apparatus 100 according to a first embodiment will be described.
(1) Hardware Configuration of Signal Processing Apparatus 100

Figure 1:
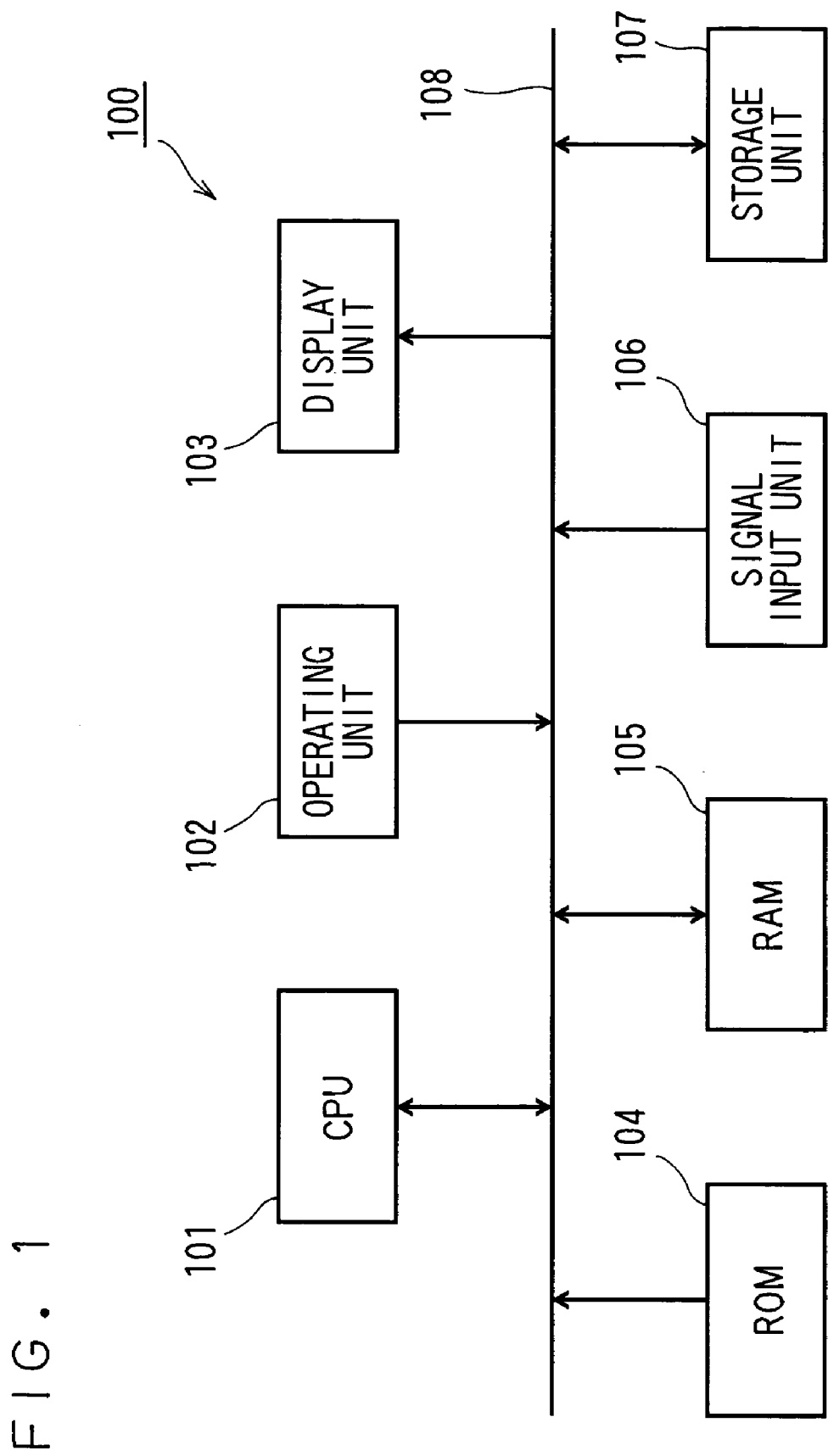
FIG. 1 illustrates a hardware configuration of a signal processing apparatus.

FIG. 1 is a block diagram showing a hardware configuration of the signal processing apparatus 100.

As shown in FIG. 1, the signal processing apparatus 100 includes a CPU (Central Processing Unit) 101, an operating unit 102, a display unit 103, a ROM (Read Only Memory) 104, RAM (Random Access Memory) 105, a signal input unit 106 and a storage unit 107, and the respective units are connected via a bus 108.

The CPU 101 carries out various types of processing in cooperation with various control programs stored in the ROM 104 in advance using a predetermined area in the RAM 105 as a work area, and totally controls operations the respective units which constitute the signal processing apparatus 100. The CPU 101 causes functional units such as a feature quantity extracting unit 11, a segmentalizing unit 12, a clustering unit 13, an existence probability function deriving unit 14, an existence probability function similarity calculating unit 15, a cluster integrating unit 16 and a cluster information output unit 17 described later (see FIG. 2) to function in cooperation with the program stored in the ROM 104 in advance. The operations of the respective functional units will be described later.

The operating unit 102 includes various input keys, thereby receiving information entered by the user as input signals and outputting the input signals to the CPU 101.

The display unit 103 includes a display device such as an LCD (Liquid Crystal Display), and displays various types of information on the basis of the display signals from the CPU 101. The display unit 103 may take a form which constitutes a touch panel integrated with the operating unit 102.

The ROM 104 unrewritably stores programs and various setting information relating to control of the signal processing apparatus 100.

The RAM 105 is a storage device such as an SDRAM which functions as a work area of the CPU 101 and serves, for example, as a buffer.

The signal input unit 106 converts video images or speeches into electric signals, and outputs the same to the CPU 101 as video signals. The signal input unit 106 may be a broadcast program receiver (tuner).

The storage unit 107 includes a magnetically or optically recordable storage medium, and stores data such as video signals acquired through the signal input unit 106 or video signal entered from the outside thorough a communication unit or an I/F (interface), not shown. The storage unit 107 stores video signal attached with labels (indexes) by the cluster information output process, described later.
(2) Configuration of Function of Signal Processing Apparatus 100

Figure 2:
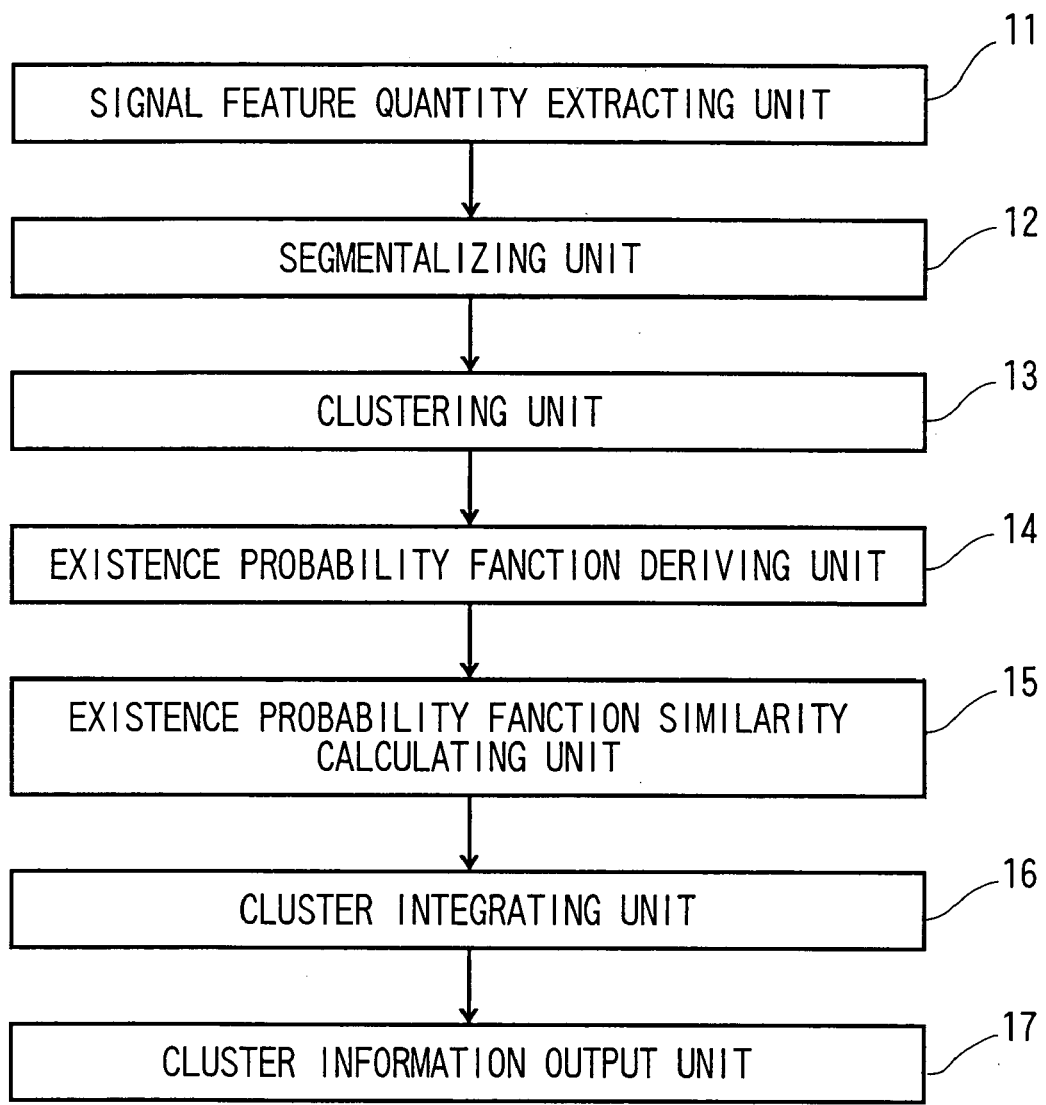
FIG. 2 illustrates a configuration of a function of the signal processing apparatus according to a first embodiment.

FIG. 2 is a block diagram showing a configuration of the function of the signal processing apparatus 100.

As shown in FIG. 2, the signal processing apparatus 100 includes the feature quantity extracting unit 11, the segmentalizing unit 12, the clustering unit 13, the existence probability function deriving unit 14, the existence probability function similarity calculating unit 15, the cluster integrating unit 16 and the cluster information output unit 17.

The functions of these functional units will be described respectively.
(3) Feature Quantity Extracting Unit 11

The feature quantity extracting unit 11 extracts the feature quantity for a period of time c2 at regular time intervals c1 from the video signal entered via the signal input unit 106, and outputs the extracted feature quantity to the segmentalizing unit 12. In this case, the speech feature quantity which indicates features of the speech signal such as the speaker's property or an image feature quantity which represents the feature of the video image signal such as a histogram of a shooting object are used as the "feature quantity".

The feature quantity extracting unit 11 is able to extract the speech feature quantity. The extraction of the speech feature quantity is achieved by obtaining a cepstrum system feature quantity such as MFCC or LPC cepstrum extracted from a signal for a period of time c4 at regular time intervals c3, and using the average value for a period of time c2 at regular time intervals c1 as the speech feature quantity.

Alternatively, a method of "Unsupervised Speaker Indexing using Anchor Models and Automatic Transcription of Discussions" by Y. Akita et. al, ISCA 8th European Conf. Speech Communication and Technology (Eurospeech), September 2003 is also employed. According to this method, probabilities of a plurality of acoustic models prepared in advance are obtained for the cepstrum system feature quantity such as the MFCC or the LPC cepstrum included in a signal for a period of time c4 at regular time intervals c3, and the probability vector having the obtained probabilities as components is determined as the speech feature quantity. The time lengths c1 to c4 have a relation of c3<=c4<=c1<=c2. For example, value of 0.25 seconds, 0.5 seconds, 10 milliseconds and 25 milliseconds may be set for c1, c2, c3 and c4 respectively.

The feature quantity extracting unit 11 is able to extract the image feature quantity. Extracting of the image feature quantity may be achieved, for example, by a method described in Patent Document 1. According to this embodiment, a 36-segment histogram is calculated from hue values of pixels belonging to images obtained at regular time periods c5, and the vectors having respective degrees of 36 segments as components are determined as the image feature quantities. The time periods c1, c2 and c5 have a relation of c5<=c1<=c2, and, for example, a value of 0.5 seconds may be set as c1, c2 and c5.

(4) Segmentalizing Unit 12

The segmentalizing unit 12 segmentalizes the feature quantity entered by the feature quantity extracting unit 11 at regular time intervals c6 and outputs the same to the clustering unit 13. The period of time c6 has a relation c2<=c6 and, for example, one second may be set as c6.

Figure 3:
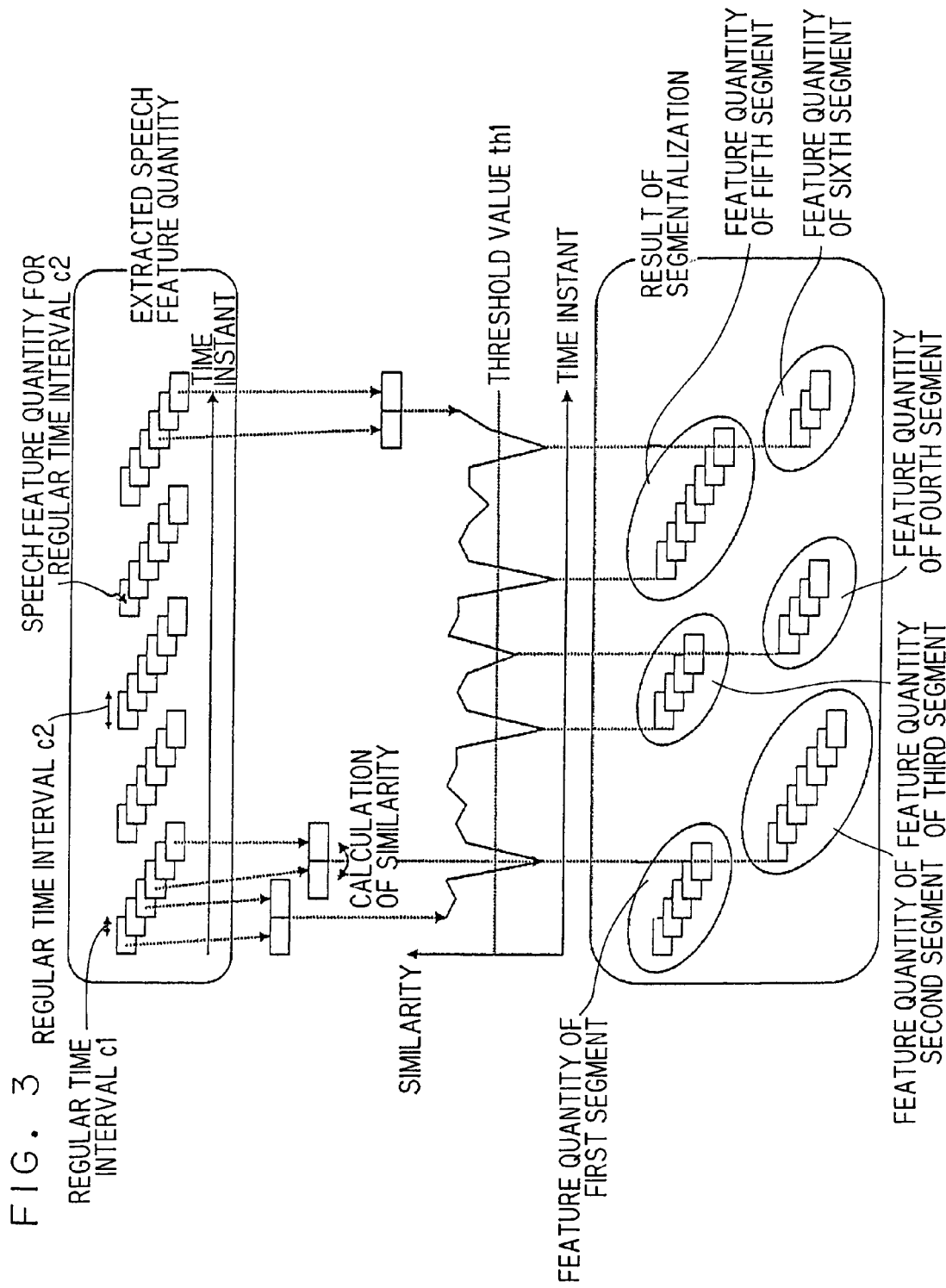
FIG. 3 illustrates an example of operation relating to a segmentalizing unit using a speech feature quantity.

The segmentalizing unit 12 detects a time instant at which the similarity between adjacent feature quantities on the time sequence is decreased to a minimum level below a threshold value th1 using the speech feature quantities entered by the feature quantity extracting unit 11 as shown in FIG. 3, sectionalizes the feature quantity at every detected time instant and outputs the same to the clustering unit 13. The similarity which may be utilized here is, for example, a value obtained by multiplying the distortion on the basis of the Euclidian distance between the feature quantities expressed by vector by −1. The threshold value th1 may be set on the basis of experience, and since the feature quantity is segmentalized at time instances when speaker exchange occurs, the clustering unit 13 is able to handle the segments by the unit of utterance.

Figure 4:
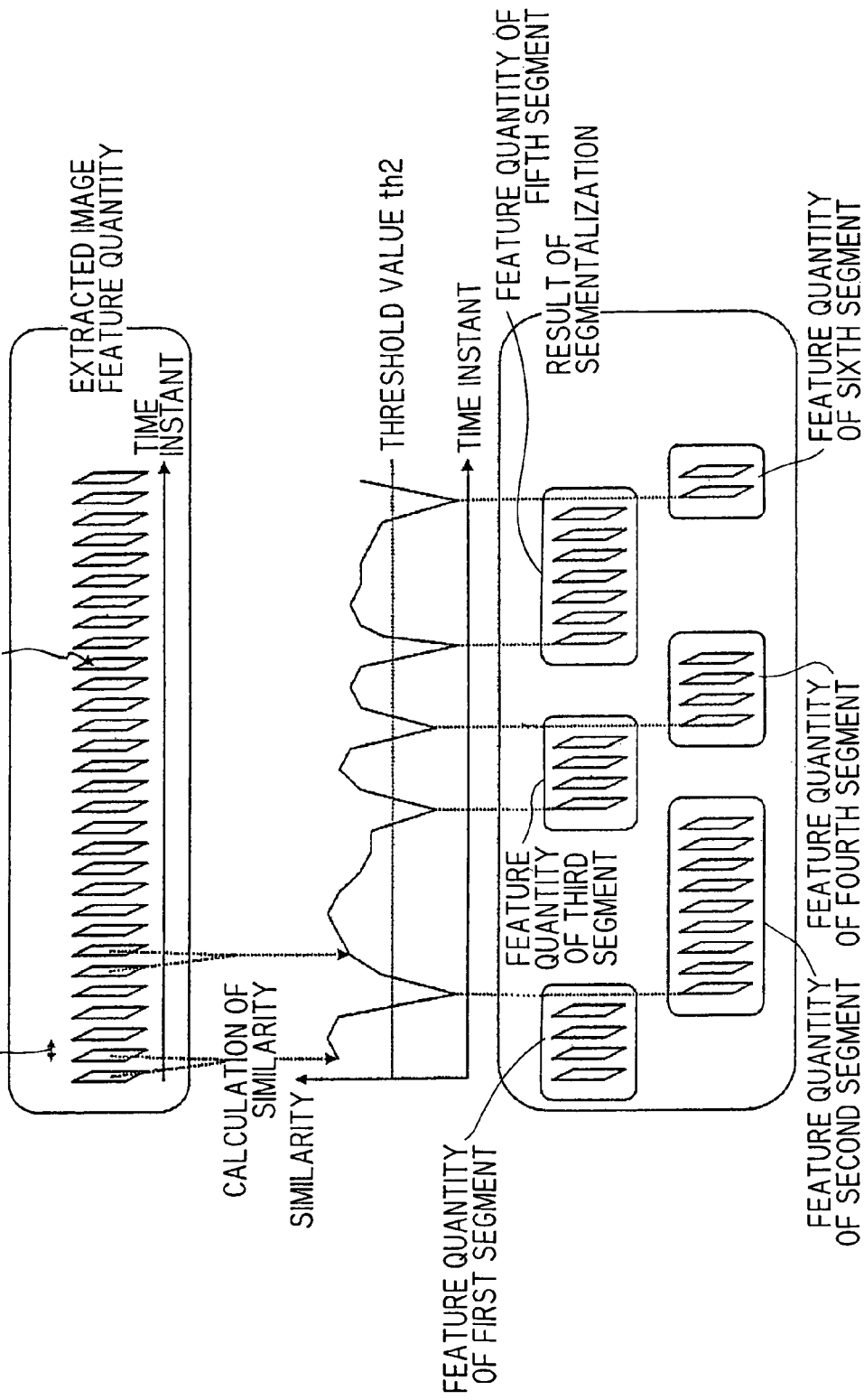
FIG. 4 illustrates an example of operation relating to the segmentalizing unit using an image feature quantity.

The segmentalizing unit 12 detects the time instant at which the similarity between adjacent feature quantities on the time sequence is decreased to a minimum level below a threshold value th2 using the image feature quantities entered by the feature quantity extracting unit 11 as shown in FIG. 4, sectionalizes the feature quantity at every detected time instant and outputs the same to the clustering unit 13. The similarity which may be utilized here is a value obtained by multiplying the histogram finite difference by −1. The threshold value th2 may be set on the basis of experience, and the clustering unit 13 is able to handle the segments by the unit of shot.

(5) Clustering Unit 13

The clustering unit 13 puts the segments having similar feature quantity from among all the entered segments together into one class (cluster), and provides a common identifier (class number) to all the segments which belong to the corresponding class.

The clustering unit 13 outputs segment information (start and end time instants of the segments, and information on the identifier of the classes which the segments belongs to) to the existence probability function deriving unit 14.

Here, determination whether the segments are similar or not is achieved by obtaining an average of the feature quantities included in the segment and expressed by the vector and determine based on whether the distortion between the averages on the basis of the Euclidean distance is small or not, and algorithm which may be used when clustering is known k-means method.

FIG. 5 shows an example of a result of clustering in which the content signal is classified into four classes and attached with identifiers A, B, C and D. The output information may be added with accumulated segment length or number of segments in each class in addition to the segment information.

(6) Existence Probability Function Deriving Unit 14

Subsequently, the existence probability function deriving unit 14 will be described.

(6-1) Existing Function

Figure 6:
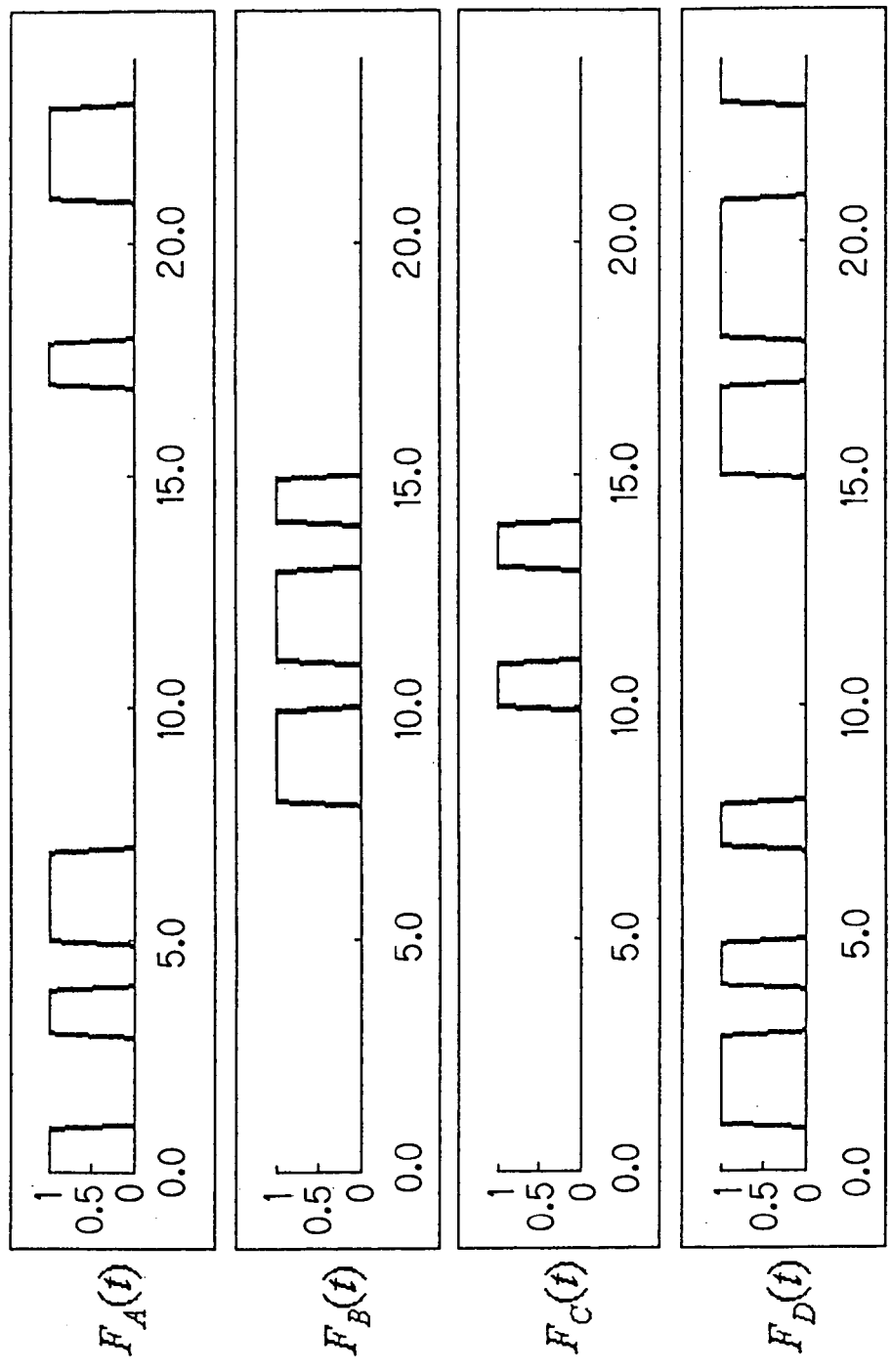
FIG. 6 illustrates an example of operation relating to deriving of existence functions carried out by an existence probability function deriving unit.

The existence probability function deriving unit 14 obtains, first of all, an existence function expressed in binary of whether (1) there exists a segment which belongs to a corresponding class or not (0) at every time instants for each class. For example, FIG. 6 shows results of processing carried out when the result of clustering in FIG. 5 is obtained, and shows the state of existence in the segments of classes A, B, C and D in sequence from the top. Here, the existence function $F_C(t)$ of the class C is expressed as Expression (1)

$$F_C(t) = \begin{cases} 1 & (10 \le t < 11 \text{ or } 13 \le t < 14) \\ 0 & (0 \le t < 10 \text{ or } 11 \le t < 13 \text{ or } 14 \le t < 24) \end{cases} \quad (1)$$

In the same manner, the existence functions $F_A(t)$, $F_B(t)$, $F_D(t)$ of the classes A, B and D are also obtained.

(6-2) Existence Probability

Subsequently, for the respective existence functions, the existence function "1" is given to a time instant at which the value is "1", and the existence function smaller than "1" is given while damping in the time direction toward the value "0". When obtaining the existence function probability function, a function L(x) in the expression (2) shown below is prepared first.

$$L(x) = \begin{cases} x & (x > 0) \\ 0 & (x \le 0) \end{cases} \quad (2)$$

Here, when the value of the existence function is changed from "0" to "1" at the time instant $i_k (1<=k<=I)$ as a boundary, a function $I_k(t)$ for obtaining the existence probability candidates at the time instant t is defined as:

$$I_k(t) = \begin{cases} L\left(1 - \frac{1}{2}(i_k - t)\right) & (t \le i_k) \\ 0 & (t > i_k) \end{cases} \quad (3)$$

When the value of the existence function is changed from "1" to "0" at the time instant $j_k (1<=k<=J)$ as a boundary, a function $J_k(t)$ for obtaining the existence probability candidates at the time instant t is defined as:

$$J_k(t) = \begin{cases} L\left(1 - \frac{1}{2}(t - j_k)\right) & (t \geq j_k) \\ 0 & (t < j_k) \end{cases} \quad (4)$$

Then, an existence probability function $G_x(t)$ relating to the class X is expressed as the expression (5).

$$G_X(t) = \max\left(\max_{1 \leq k \leq I} I_k(t), \max_{1 \leq k \leq J} J_k(t), F_X(t)\right) \quad (5)$$

Figure 7A:
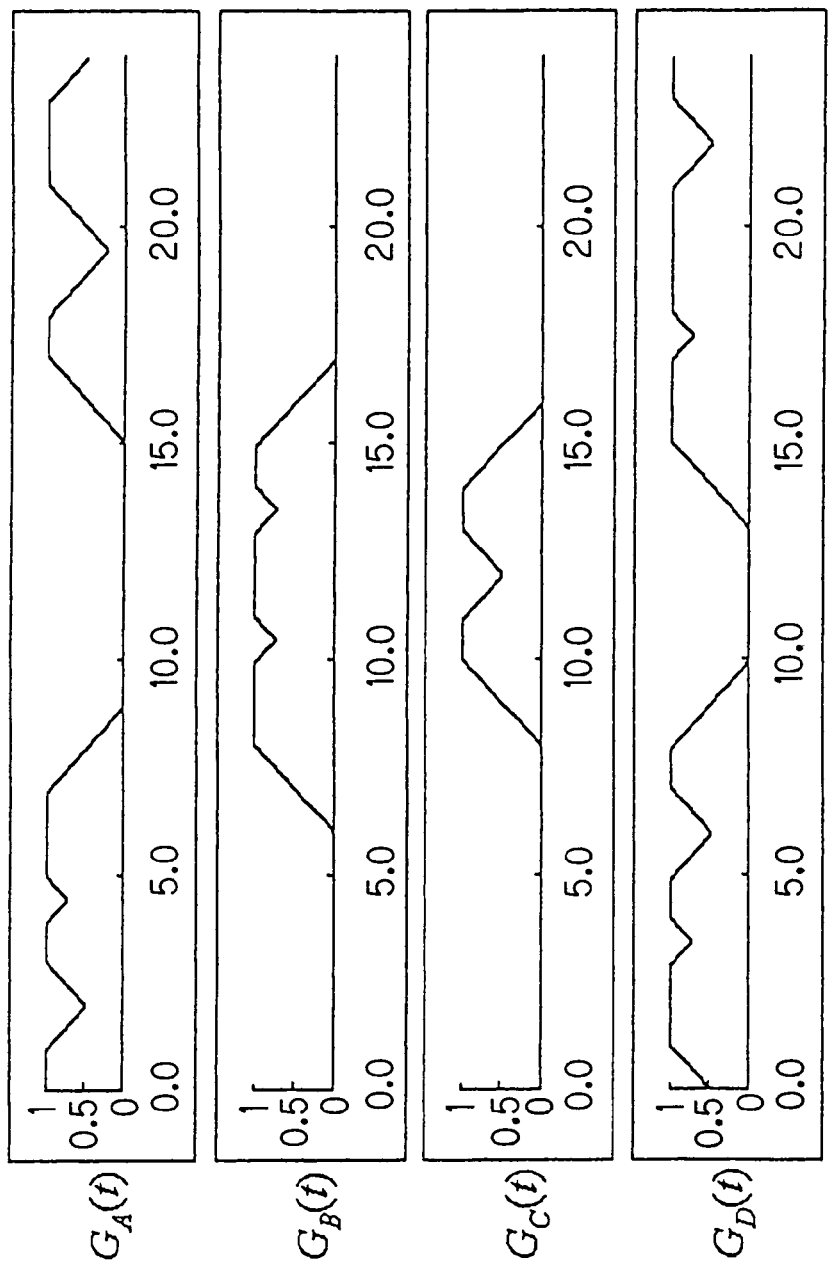
FIG. 7A illustrates an example of operation relating to deriving of the existence probability functions carried out by the existence probability function deriving unit.

For example, in the example shown in FIG. 7A, the existence probability function is obtained using the existence function shown in FIG. 6, and an existence probability function $G_C(t)$ in the class C will be;

$$G_C(t) = \begin{cases} 1 & (10 \leq t < 11 \text{ or } 13 \leq t < 14) \\ 1 - \frac{1}{2}(10 - t) & (8 \leq t < 10) \\ 1 - \frac{1}{2}(t - 11) & (11 \leq t < 12) \\ 1 - \frac{1}{2}(13 - t) & (12 \leq t < 13) \\ 1 - \frac{1}{2}(t - 14) & (14 \leq t < 16) \\ 0 & (0 \leq t < 8 \text{ or } 16 \leq t < 24) \end{cases} \quad (6)$$

In the same manner, the existence probability functions $G_A(t)$, $G_B(t)$ and $G_D(t)$ of the classes A, B and D are also obtained.

Then, information on the existence probability function is added to the segment information, and is outputted to the existence probability function similarity calculating unit 15.

When the existence probability function deriving unit 14 provides the existence probability lower than "1" to the existence function obtained for each class while damping in the time direction toward the value "0", the existence probability function deriving unit 14 changes the ratio of damping using the value of the existence function at a time instant in future. For example, it is achieved by changing the functions $I_k(t)$ and $J_k(t)$ used in FIG. 7A into:

$$I_k(t) = \begin{cases} L\left(1 - \frac{1}{4}(i_k - t)\right) & \left(t \leq i_k \text{ and } \max_{i_k - R \leq x \leq i_k} F_C(x) = 1\right) \\ L(1 - (i_k - t)) & \left(t \leq i_k \text{ and } \max_{i_k - R \leq x \leq i_k} F_C(x) = 0\right) \\ 0 & (t > i_k) \end{cases} \quad (7)$$

$$J_k(t) = \begin{cases} L\left(1 - \frac{1}{4}(t - j_k)\right) & \left(t \geq j_k \text{ and } \max_{j_k \leq x \leq j_k + R} F_C(x) = 1\right) \\ L(1 - (t - j_k)) & \left(t \geq j_k \text{ and } \max_{j_k \leq x \leq j_k + R} F_C(x) = 0\right) \\ 0 & (t < j_k) \end{cases} \quad (8)$$

Here, the time length R is a value for determining the time period for considering the value of the existence function for the past and future. The time length R may be set as desired, and, for example, three seconds may be set as the value of "R". Therefore, when the existence functions in FIG. 6 are given, as shown in FIG. 7B, the existence probability function $G_C(t)$ of the class C is, $$G_C(t) = \begin{cases} 1 & (10 \leq t < 11 \text{ or } 13 \leq t < 14) \\ 1 - (10 - t) & (9 \leq t < 10) \\ 1 - \frac{1}{4}(t - 11) & (11 \leq t < 12) \\ 1 - \frac{1}{4}(13 - t) & (12 \leq t < 13) \\ 1 - (t - 14) & (14 \leq t < 15) \\ 0 & (0 \leq t < 9 \text{ or } 15 \leq t < 24) \end{cases} \quad (9)$$

In the same manner, the existence probability functions $G_A(t)$, $G_B(t)$ and $G_D(t)$ for the classes A, B and D are also obtained.

Then, information on the existence probability function is added to the segment information and is outputted to the existence probability function similarity calculating unit 15.

(6-3) Existence Probability Function

Then, the existence probability function deriving unit 14 obtains normal distributions which can be calculated from the values of the existence functions in analytical windows which correspond to a window width period c7 for the respective shift widths having the shift width period c8. Then, the existence probability function is defined by combining the normal distributions obtained in this manner.

The window width period c7 and the shift width period c8 have a relation c1<=c6<=c8<=c7, and c7 and c8 may be set to four seconds and one second respectively. Assuming that the range of the $k^{th}$ analytic window is $[p_k, q_k]$ $(q_k - p_k = c7)$, the average $\mu_k$ and the dispersion $\sigma_k^2$ in the $k^{th}$ analytic window in the class C are expressed using the analytic unit time $\tau$ as follows.

$$\mu_k = \frac{\sum_{t=p_k}^{q_k - \tau} F_C(t) \cdot t}{\sum_{t=p_k}^{q_k - \tau} F_C(t)} \quad (10)$$

$$\sigma_k^2 = \frac{\sum_{t=p_k}^{q_k - \tau} F_C(t) \cdot (t - \mu_k)^2}{\sum_{t=p_k}^{q_k - \tau} F_C(t)} \quad (11)$$

The analytic unit timer is sufficiently small value (for example, 0.1 second), and the average and the dispersion are not obtained for the analytic window in which $\Sigma F_C(t) = 0$. Therefore, the normal distribution $H_k(t)$ in the $k^{th}$ analytic window is expressed by:

$$H_k(t) = \begin{cases} \frac{1}{\sqrt{2\pi} \cdot \sigma_k} \exp\left(-\frac{(t - \mu_k)^2}{2 \cdot \sigma_k^2}\right) & \left(\sum_{t=p_k}^{q_k - \tau} F_C(t) \neq 0\right) \\ 0 & \left(\sum_{t=p_k}^{q_k - \tau} F_C(t) = 0\right) \end{cases} \quad (12)$$

Alternatively, it may use the weighting factor $h_k$ as expressed by:

$$h_k = \sum_{t=p_k}^{q_k - \tau} F_C(t) \quad (13)$$

and expressed by:

$$H_k(t) = \begin{cases} \dfrac{h_k}{\sqrt{2\pi} \cdot \sigma_k} \exp\left(-\dfrac{(t-\mu_k)^2}{2\cdot\sigma_k^2}\right) & \left(\sum_{t=p_k}^{q_k-\tau} F_C(t) \neq 0\right) \\ 0 & \left(\sum_{t=p_k}^{q_k-\tau} F_C(t) = 0\right) \end{cases} \quad (14)$$

Therefore, in a case in which the N analytic windows are generated, the existence probability function $G_C(t)$ of the class C will be expressed by:

$$G_C(t) = \max_{1 \leq k \leq N} H_k(t) \quad (15)$$

Figure 7C:
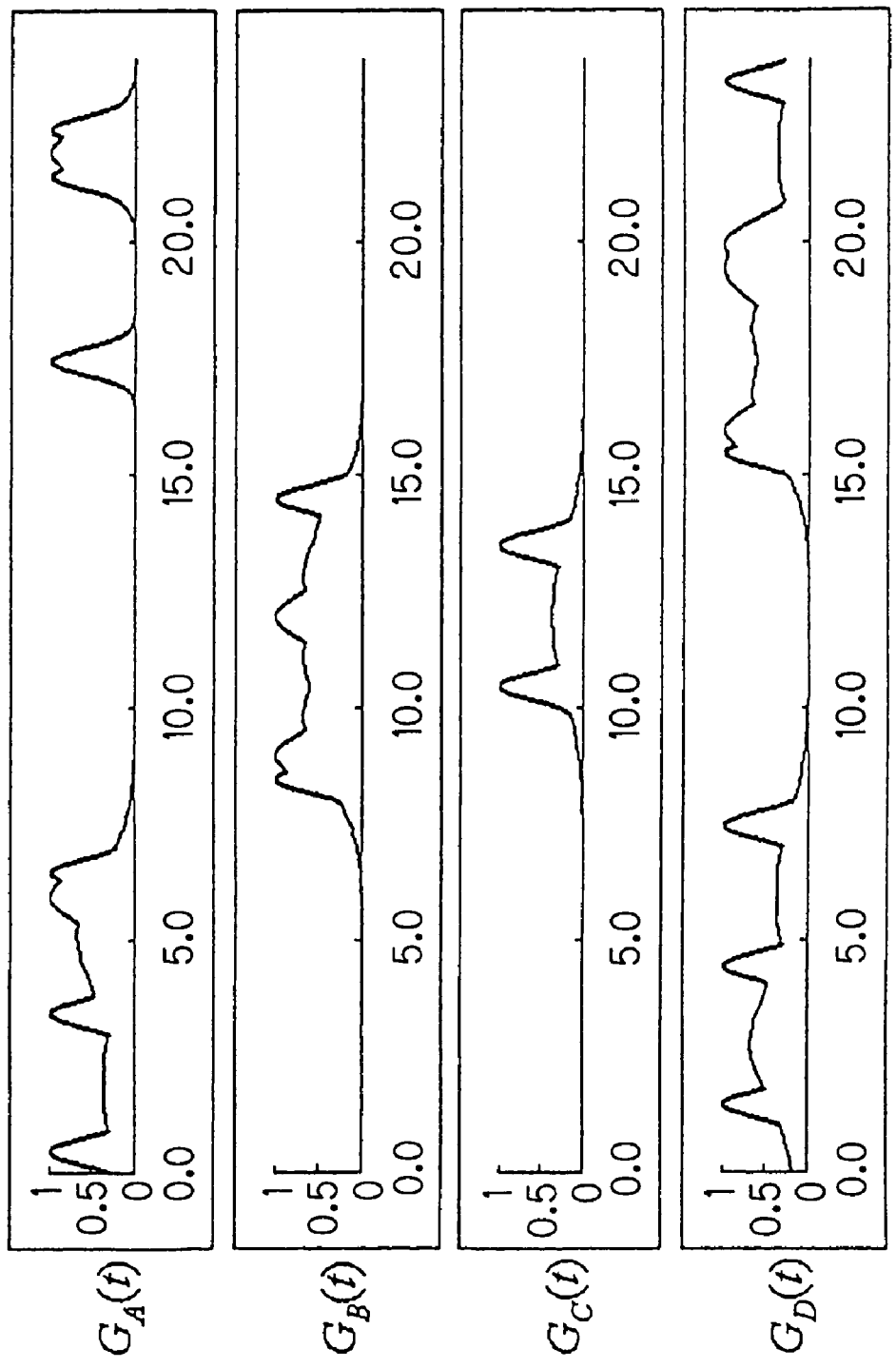
FIG. 7C illustrates an example of operation relating to deriving of the existence probability functions carried out by the existence probability function deriving unit.

In the same manner, the existence probability functions $G_A(t)$, $G_B(t)$ and $G_D(t)$ for the classes A, B and D are obtained, and the existence probability functions obtained from the existence functions shown in FIG. 6 is shown in FIG. 7C. Then, information on the existence probability functions is added to the segment information, which is outputted to the existence probability function similarity calculating unit 15.

(7) Existence Probability Function Similarity Calculating Unit 15

The existence probability function similarity calculating unit 15 obtains similarities for all the combinations of the entered existence probability functions, records the result in the similarity table, and outputs the same to the cluster integrating unit 16.

Referring now to FIG. 8, FIGS. 9A to 9C, operation of the existence probability function similarity calculating unit 15 will be described.

Here, FIG. 8 is a flowchart showing a procedure of the existence probability function similarity calculating process carried out by the existence probability function similarity calculating unit 15.

FIGS. 9A to 9C show similarity tables recorded as a result of the operation using the existence probability function in FIGS. 7A to 7C respectively.

The existence probability function similarity calculating unit 15 sets a variable "a" to "1" (Step S11). Subsequently, the existence probability function similarity calculating unit 15 sets a variable "b" to "a+1" (Step S12).

These two variables are used to determine what numbers of classes the target of calculation of the existence probability function similarities belong to. Then, whether the value "b" exceeds the class number M or not is confirmed (Step S13).

If yes, the value "a" is determined to be a+1 (Step S14) and confirms that the "a" is not the class number M (Step S15). If no, the procedure goes back to Step S12, and the variable b is reset to a+1.

When "a" is the class number M in Step S15, it means that the similarity calculation is finished for all the combination of the existence probability functions, and hence the process is ended.

When "b" does not exceed the class number M in Step S13, the similarity S(a, b) of the existence probability functions of the $a^{th}$ class and the $b^{th}$ class is calculated (Step S16). The method of calculating the similarity is, as shown by the expression:

$$S(a, b) = \left( \frac{\sum_{t=0}^{T} \min(G_a(t), G_b(t))}{\sum_{t=0}^{T} G_a(t)} + \frac{\sum_{t=0}^{T} \min(G_a(t), G_b(t))}{\sum_{t=0}^{T} G_b(t)} \right) / 2 \quad (16)$$

an overlapped portion of the existence probability function of the $a^{th}$ class and the $b^{th}$ class in the program length T is calculated, and the average of the ratio to the accumulated probability of the $a^{th}$ class and to the accumulated probability of the $b^{th}$ class is obtained.

Alternatively, the similarity on the basis of Euclidean distance may be obtained by converting the existence probability function into the vector expression using the analytic unit time τ.

Then, the obtained similarity and combination information of classes compared when obtaining the similarity are recorded in the similarity table (Step S17).

When recorded, the value of "b" is set to b+1 (Step S18), and the procedure goes back to Step S13 where the similarity calculating process in a new combination is started.

(8) Cluster Integrating Unit 16

The cluster integrating unit 16 carries out a process to obtain an integrated class by integrating information on the plurality of classes on the basis of the entered similarity table information, and information on classes which newly obtained segments belong to is outputted to the cluster information output unit 17.

Figure 10:
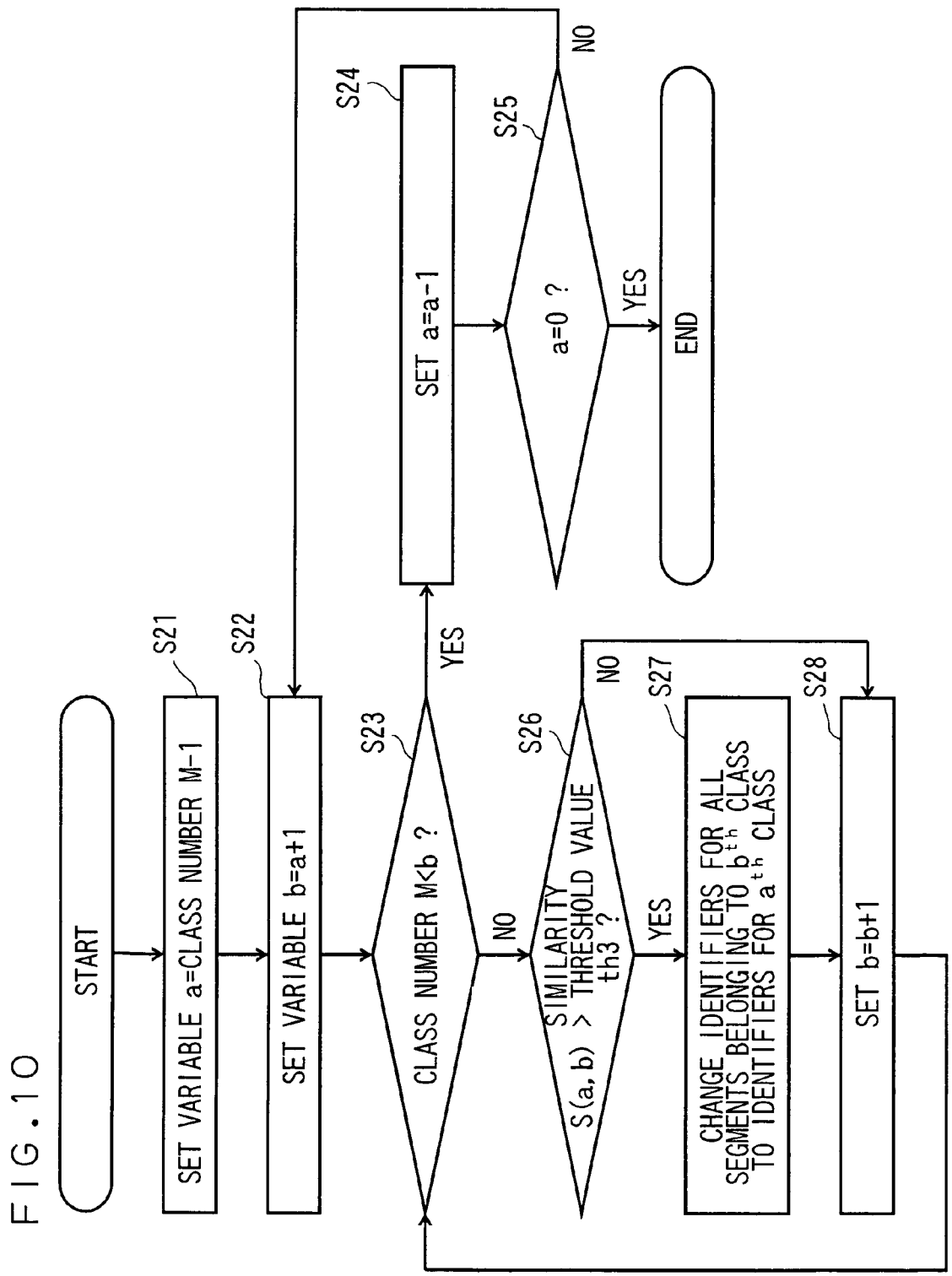
FIG. 10 is a flowchart showing a procedure of operation of a cluster integrating unit.

Referring now to FIG. 10, operation of the cluster integrating unit 16 will be described. FIG. 10 is a flowchart showing a procedure of cluster integrating process carried out by the cluster integrating unit 16.

In Step S21, the cluster integrating unit 16 sets the variable "a" to the class number M−1.

Then, in Step S22, the variable "b" is set to a+1. These two variables are used to determine what numbers of classes the target of integrity determination belong to. Then, when the value "b" exceeds the class number M, the procedure goes to Step S24, and when the value "b" does not exceed the class number M, the procedure goes to Step S26.

Then, in Step S23, whether the value "b" does not exceed the class number M is confirmed.

Then, in Step S24, since the value "b" exceeds the class number M, the value "a" is set to "a−1".

Then, in Step S25, whether the value "a" is not "0" is confirmed. If not, the procedure goes back to Step S22, and the value "b" is reset to a+1. When the value "a" is "0", it means that the integrity determination is finished for all the combinations of classes, and hence the process is ended.

Then, in Step S26, since the value "b" does not exceed the class number M, the similarity S(a, b) of the $a^{th}$ class and the $b^{th}$ class are referred to. Then, the integrity determination process for inspecting whether S(a, b) exceeds a threshold value th3 is carried out. The threshold value th3 in this case may be set on the basis of experience.

Then, in Step S27, since the similarity exceeds the threshold value th3, the identifiers of all the segments which belong to the $b^{th}$ class are changed into the identifiers of the $a^{th}$ class.

Then, in Step S28, when the similarity does not exceed the threshold value th3 after having terminated Step S27 or in Step S26, the value "b" is set to b+1, and the procedure goes back to Step S23 where the integrity determining process with a new combination.

Assuming that the threshold value th3 is 0.5 in the cluster integrating unit 16, a common result is obtained in FIGS. 9A, 9B and 9C, and a process of obtaining an integrated class by integrating the classes A and D and obtaining an integrated class by integrating the classes B and C with respect to the existing state shown in FIG. 6 is carried out.

In the process flow in FIG. 10, the process to change D to the identifier of A and C to the identifier of B is to be performed. However, it is also possible to provide new identifier for all the segments provided again with the same identifier after the termination of the process.

(9) Cluster Information Output Unit 17

Upon reception of the output result of the cluster integrating unit 16, the cluster information output unit 17 outputs identifier of the class which the respective segments are given to belong to (that is, the integrated class), the start and end time instants of the segment.

Figure 11A:
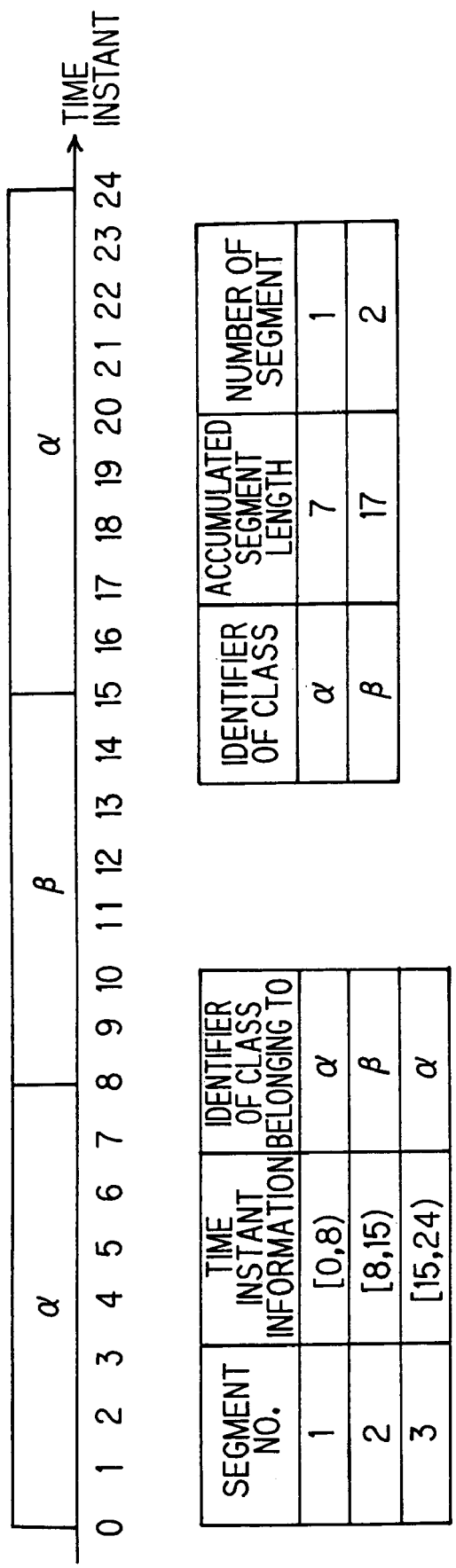
FIG. 11A is an example of operation relating to an output result of a cluster information output unit.

The cluster information output unit 17 also outputs information relating to the accumulated segment length of the segments which belong to respective classes on the class-to-class basis. For example, when the process to the cluster integrating unit is carried out for the existing states in FIG. 6, the output result shown in FIG. 11A is obtained.

The output priority provided on the basis of the accumulated segment length may also be outputted. This is obtained by assuming the states in which the color is changed when the class that the segment to be displayed on a time bar belongs to is changed for realizing the index of the video content as shown in FIG. 11B. Since there are only limited kinds of usable colors in this display state, it is not necessarily possible to assign colors to all the classes, and hence the output priority is used in this case.

(10) Content of Process

Figure 12:
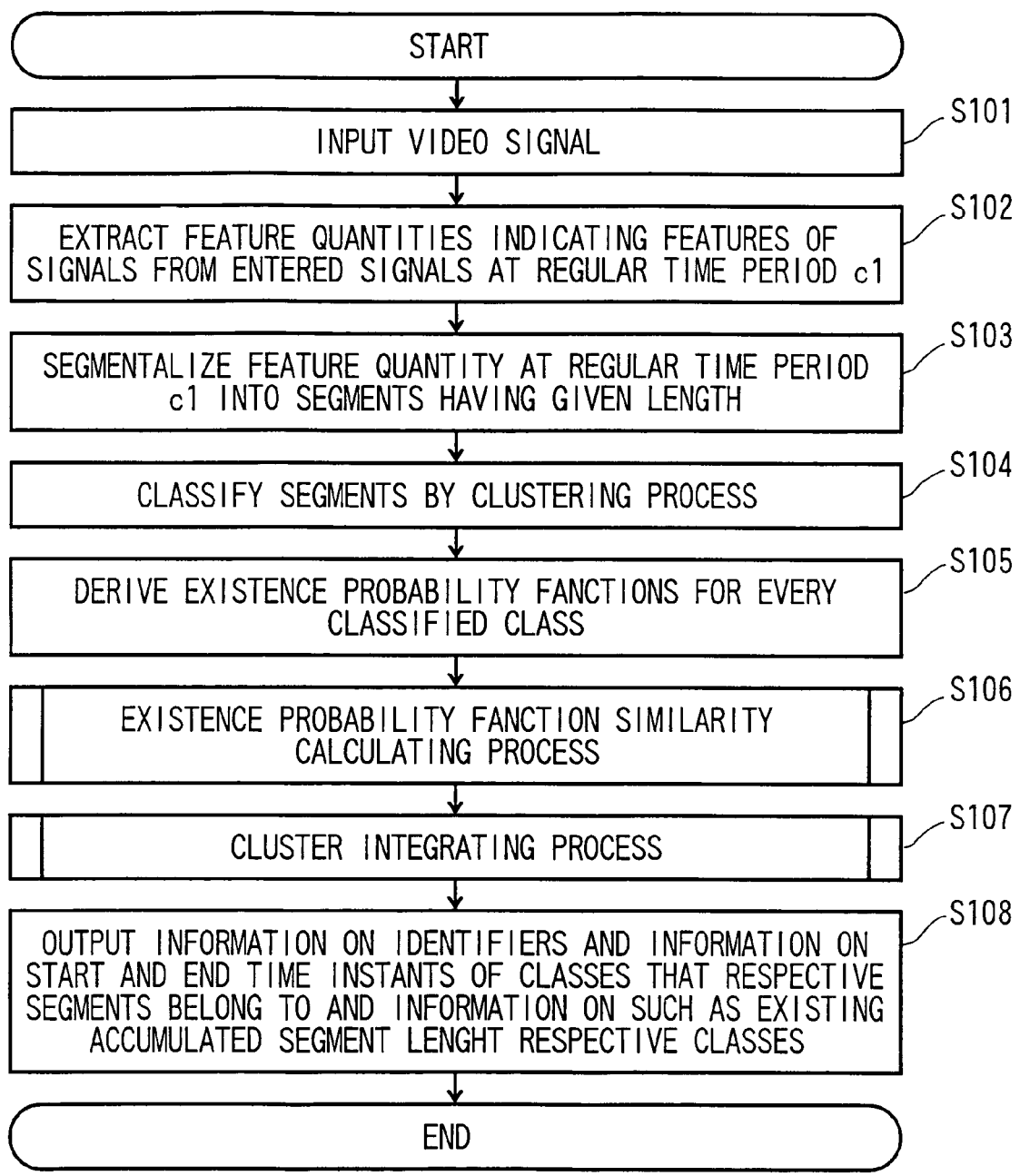
FIG. 12 is a flowchart showing a procedure of a process of the signal processing apparatus according to the first embodiment.

FIG. 12 is a flowchart showing a flow of a process carried out by the signal processing apparatus 100 in the first embodiment. Referring now to FIG. 12, the process in the first embodiment will be described.

In Step S101, a video signal is supplied via the signal input unit 106.

Then, in Step S102, the feature quantity extracting unit 11 extracts the feature quantity which indicates the feature of the signal from the entered signals at the regular time intervals c1. When the entered signal is the speech signal, the speech feature quantity which indicates the speaker's property is extracted, and when the entered signal is the video image signal, the image feature quantity such as a histogram of the shooting object is extracted. Here, the extracted feature quantity is outputted to the segmentalizing unit 12 by the feature quantity extracting unit 11.

Then, in Step S103, the segmentalizing unit 12 segmentalizes the entered feature quantity into segments having a given length. The segmentalization may be carried out at regular time intervals c6 or at the points which exhibit minimum change of the speech feature quantity or the image feature quantity on the time series. Here, information on the start and end time instants corresponding to the segmentalized feature quantity is outputted to the clustering unit 13.

Then, in Step S104, the clustering unit 13 puts the similar segments into one cluster (class) by finding the similarity among the feature quantities of the segments and classifying on the basis of the similarity. In this step, the identifiers are provided to the respective classes for discriminating the same from each other, and information on the respective segments to which the identifiers are provided is outputted to the existence probability function deriving unit 14.

Then, in Step S105, the existence probability function deriving unit 14 derives the existence probability functions for the classified classes respectively on the basis of the existence states in the segments which belong to the corresponding class. In this step, the derived existence probability functions are outputted to the existence probability function similarity calculating unit 15.

Then, in Step S106, a similarity table of the existence probability functions for all the combinations of the classes is prepared by the existence probability function similarity calculating process. The existence probability function similarity calculating unit 15 outputs the information on the segments to which the class identifiers are provided and the obtained information of the similarity table to the cluster integrating unit 16.

Then, in Step S107, the cluster integrating unit 16 provides the same identifier to the classes having the existence probability functions with high level of similarity by the cluster integrating process. The cluster integrating unit 16 outputs the information on the respective segments having the latest identifiers including changes to the cluster information output unit 17.

Finally, in Step S108, the cluster information output unit 17 records information on the identifiers of the classes that the respective segments belong to which is provided to the respective segments, the start and end time instants of the segments, information on the existing accumulated segment lengths and the number of segments of the respective classes and output priority information on the basis of the information on the accumulated segment length, and ends the process.

(11) Effects (11-1) Effect 1

As described above, according to the first embodiment, the simple result in which the amount of information is reduced is provided by deriving the existence probability functions for the respective classes using the result of the cluster integrating unit 16 and integrating the classes having high level of similarity in the existence probability functions rather than providing the information on the respective classes or the respective segments from the result of the cluster integrating unit 16.

For example, when the result of the cluster integrating unit 16 is as shown in FIG. 5, the output result of the cluster information output unit 17 will be as shown in FIG. 11. Here, assuming that the tendency of the classes which exist before and after the corner boundaries is changed, the corners are formed by a cluster of the classes A and D and a cluster of the classes B and C. In FIG. 11, the number of identifiers to be displayed is reduced from four to two, and hence identification of the corner is easy.

(11-2) Effect 2

Figure 14:
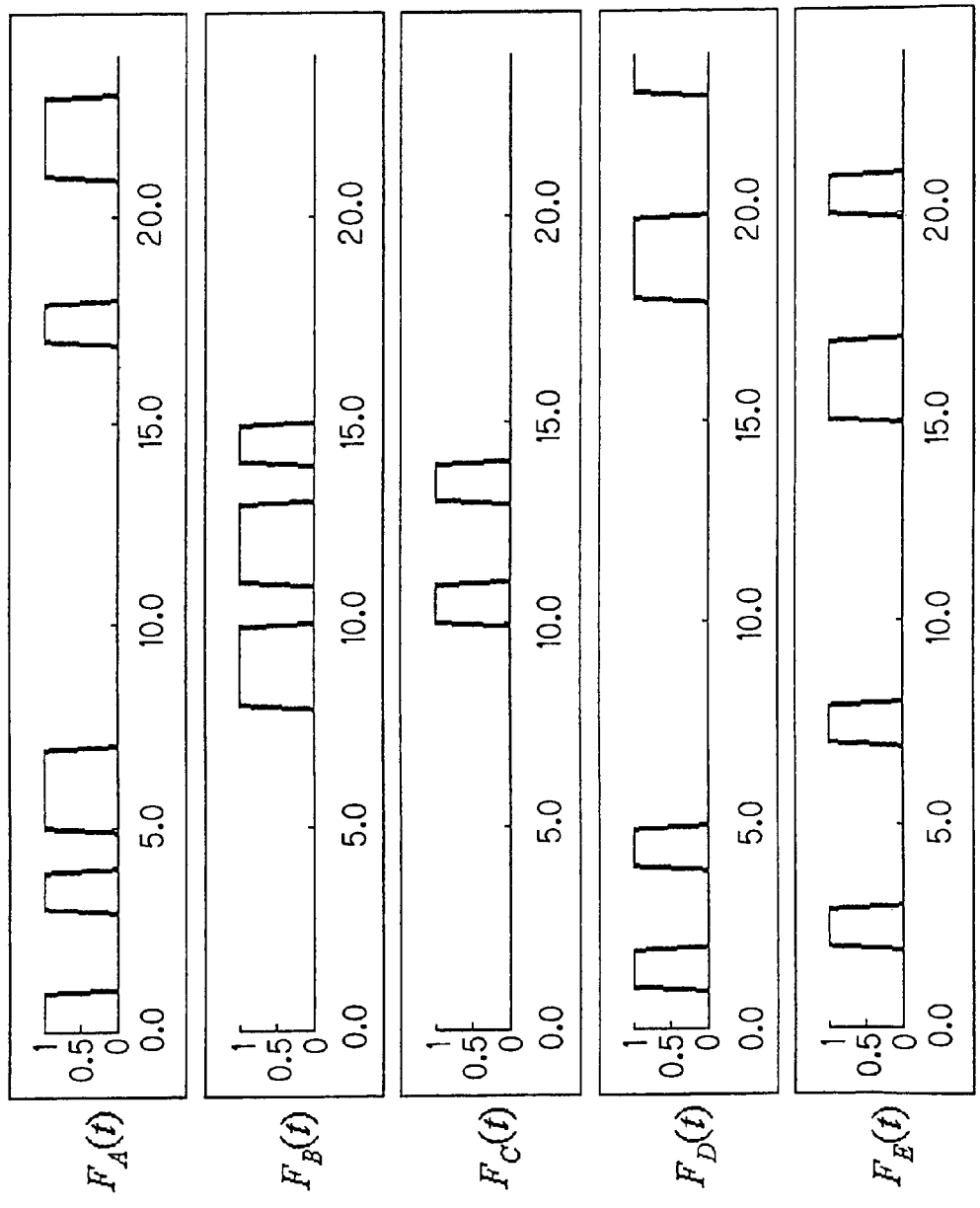
FIG. 14 illustrates an example of operation relating to deriving of existence functions carried out by the existence probability function deriving unit.
Figure 15:
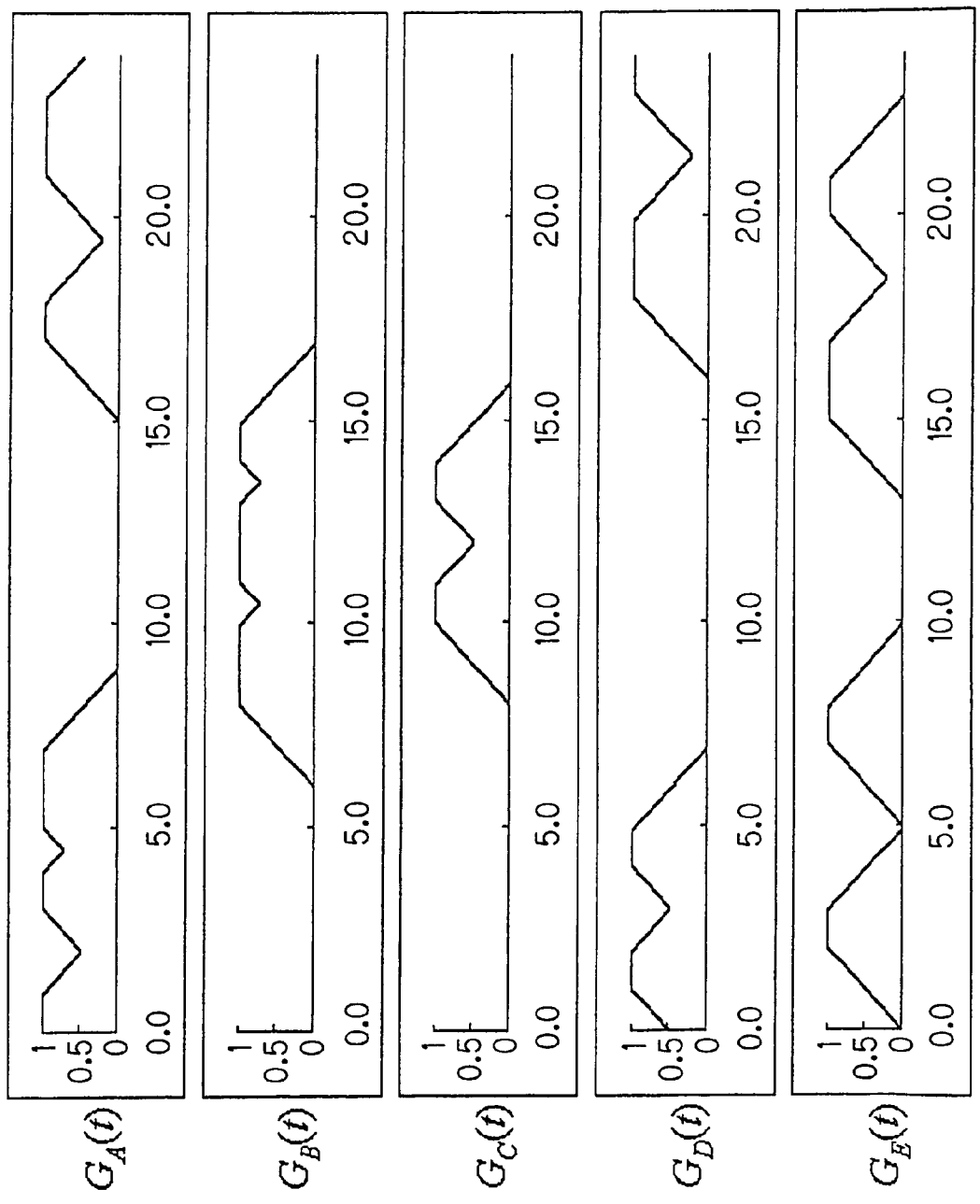
FIG. 15 is an example of operation relating to deriving of existence probability functions carried out by the existence probability function deriving unit.

According to the first embodiment, the cluster information output unit 17 is able to obtain the same result even when one corner is classified into a lot more number of classes by obtaining the existence probability function similarity. For example, as shown in FIG. 13, the existence functions and the existence probability functions as shown in FIG. 14 and FIG. 15 are obtained under the circumstance in which the class D as the result of clustering in FIG. 5 is composed of two classes of D and E.

Therefore, the similarity table obtained by the existence probability function similarity calculating unit in this example is as shown in FIG. 16 and, when the threshold value is set to 0.5, the classes A, D and E are integrated. Consequently, the same result as the output result of the cluster information output unit shown in FIG. 11 which is obtained by using the result of clustering in FIG. 5 is obtained.

Figure 13:
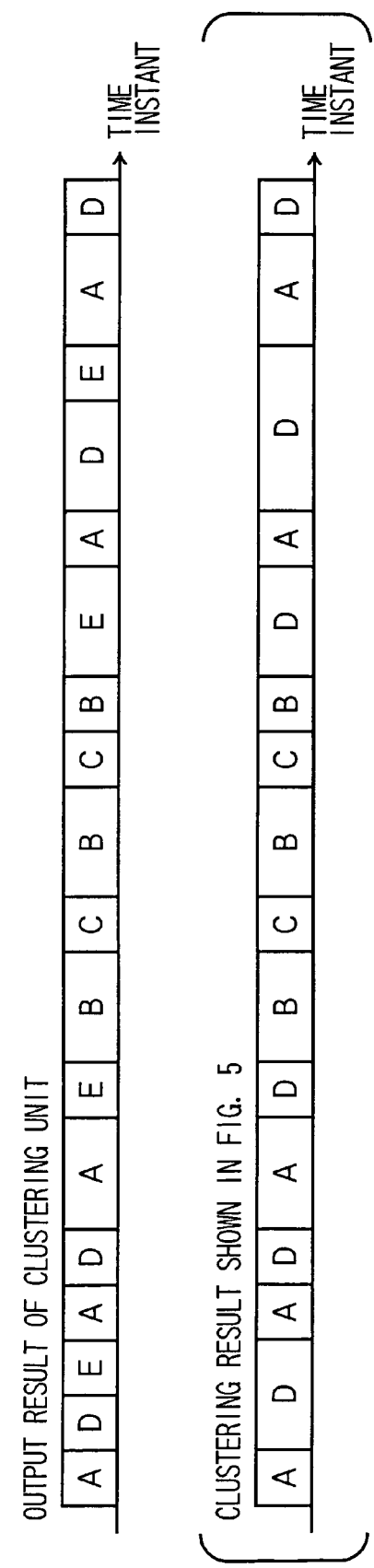
FIG. 13 illustrates an example of operation relating to the result of clustering carried out by the clustering unit.

In FIG. 13, when the two classes D and E are similar, setting of the threshold value which determines whether or not the classes D and E are handled as a cluster is necessary. However, according to the embodiment, the same output result is obtained even though it is not handled as a cluster, so that the setting of the threshold value as such is simplified.

(11-3) Effect 3

According to the first embodiment, in the process for detecting the time instants of the corner boundaries in a case in which one corner is classified into a lot more number of classes, the same detection result is obtained without changing the detecting process.

Figure 17A:
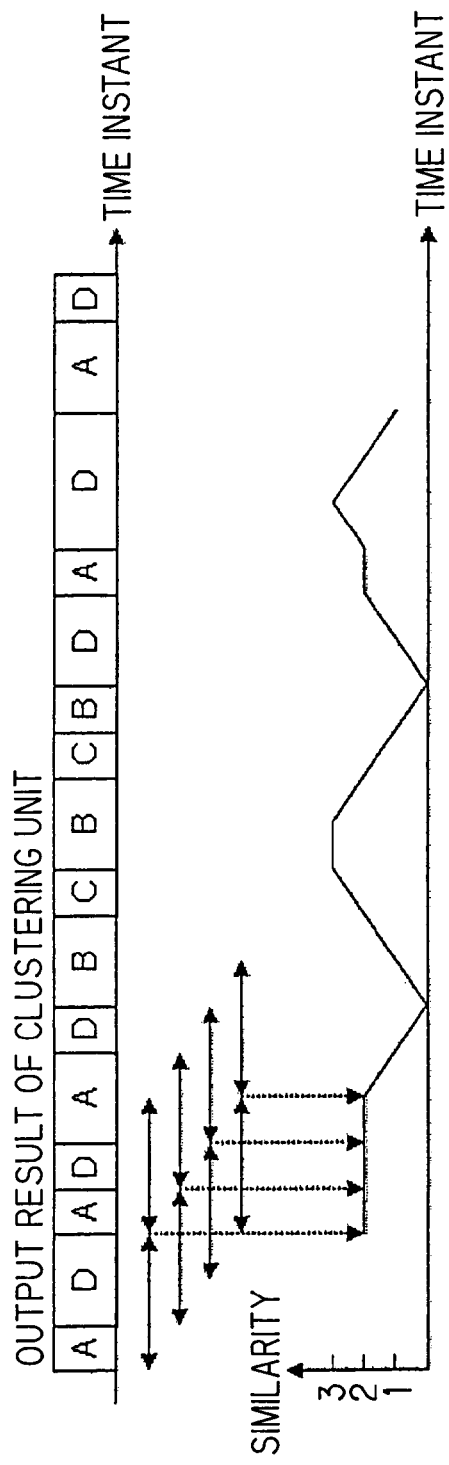
FIG. 17A illustrates an example of operation relating to detection of time instants of corner boundaries using the result of clustering carried out by the clustering unit.
Figure 17B:
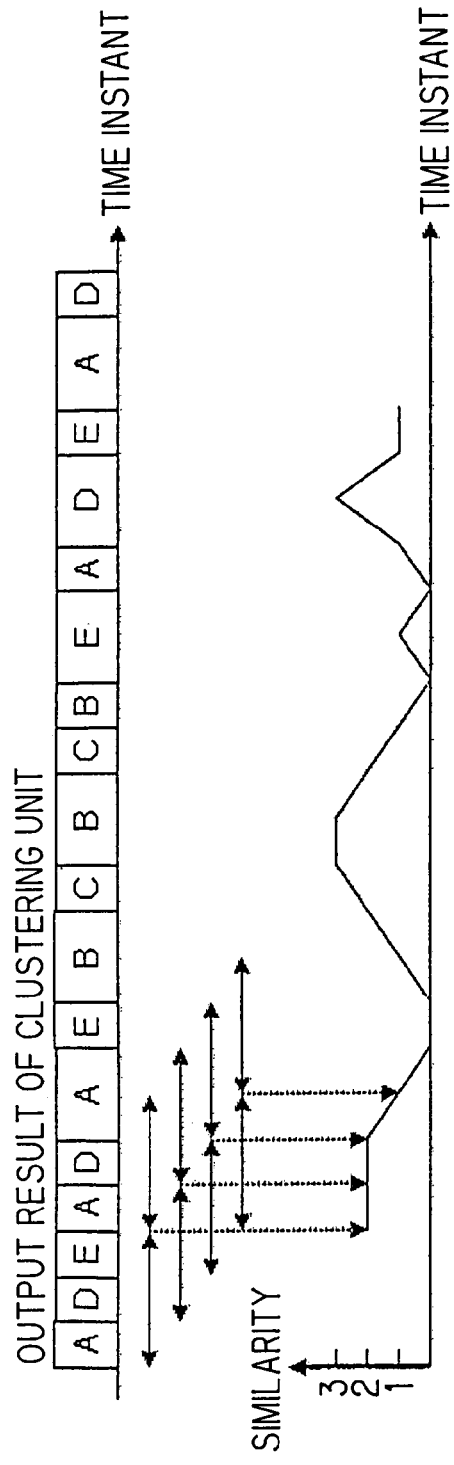
FIG. 17B illustrates an example of operation relating to detection of time instants of corner boundaries using the result of clustering carried out by the clustering unit.

For example, FIG. 17A shows an example of operation in which an attempt is made to detect the time instances of the corner boundaries from the result of clustering in FIG. 5. When detecting the corner boundaries, the similarity between adjacent time periods is calculated. The similarity is obtained according to the time length of the identifier commonly included therein. In FIG. 17A, the boundaries between the corner composed of the classes A and D and the corner composed of the classes B and C are detected as the minimum similarity time instants. However, when a larger number of classes exist than in FIG. 5 as shown in FIG. 13, the process of detecting the time instances of the corner boundaries is as shown in FIG. 17B, in which the minimum similarity time instants are not uniquely set down as in FIG. 17A.

It is because that the segment of the class D in FIG. 5 is divided into the segments of the classes D and E, and hence the possibility that the segment of the class E exists in the corner in which the classes B and C exist is considered. On the other hand, when the result of process of the first embodiment is used, the output result shown in FIG. 11 is obtained by the cluster information output unit 17 in the same manner as in the case of FIG. 5 is obtained also for the result of clustering in FIG. 13.

Figure 18:
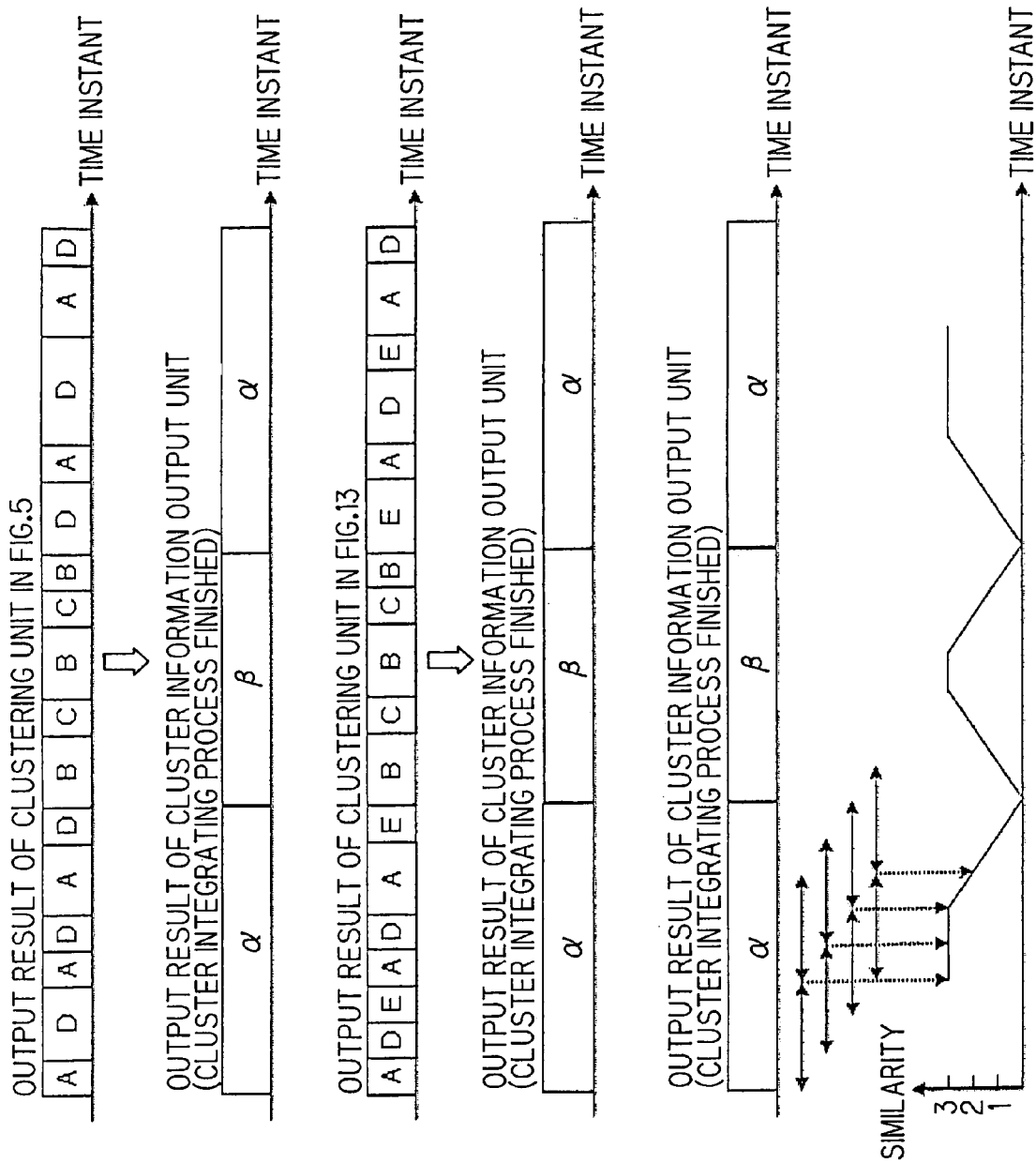
FIG. 18 is an example of operation relating to the detection of time instants of corner boundaries using the output result of the cluster information output unit.

Therefore, detection of the time instants of the corner boundaries demonstrates the same result as shown in FIG. 18, and the boundaries of the corners are detected as the minimum similarity time instants.

Second Embodiment

Figure 19:
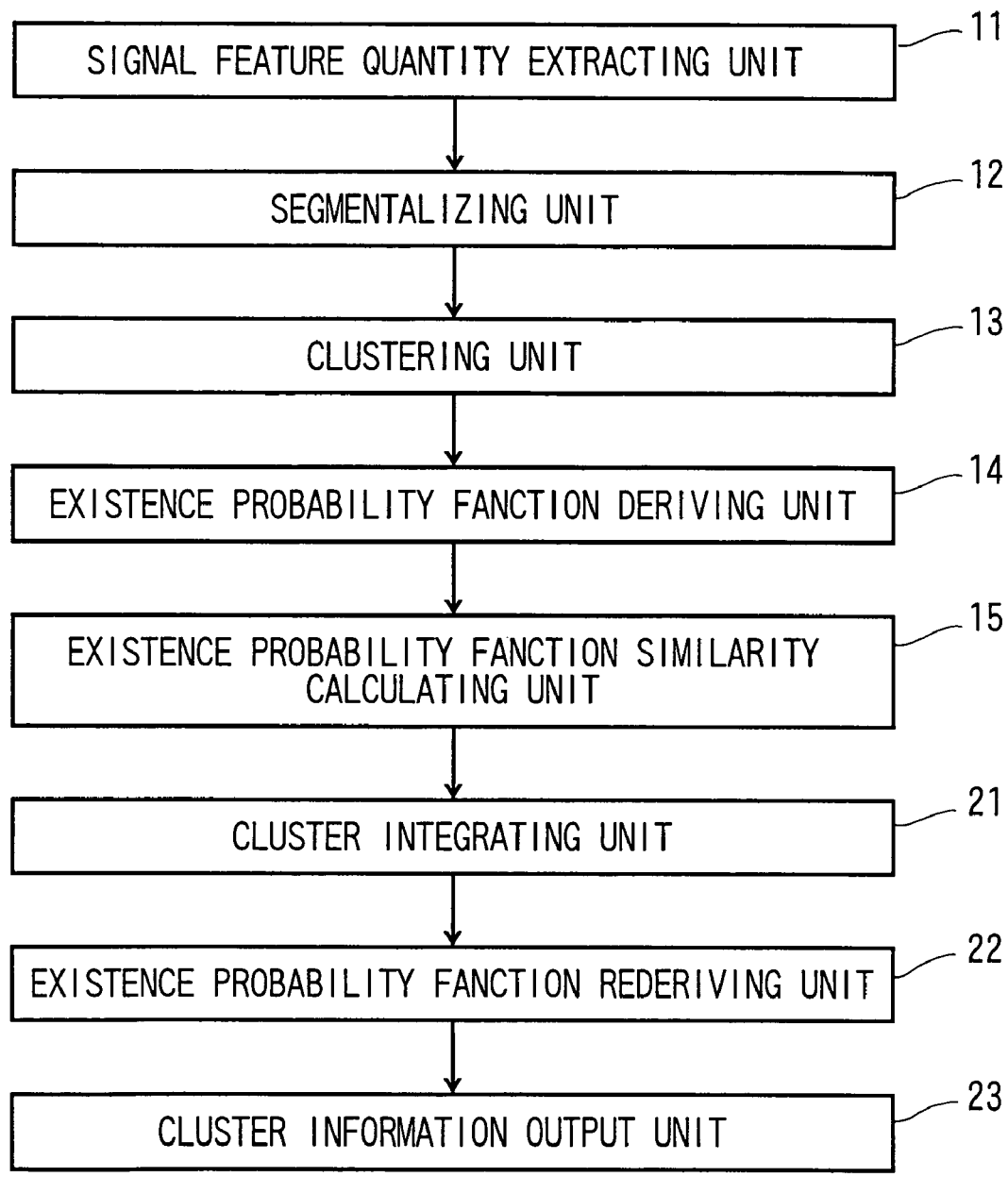
FIG. 19 illustrates a functional configuration of the signal processing apparatus according to a second embodiment.
Figure 20:
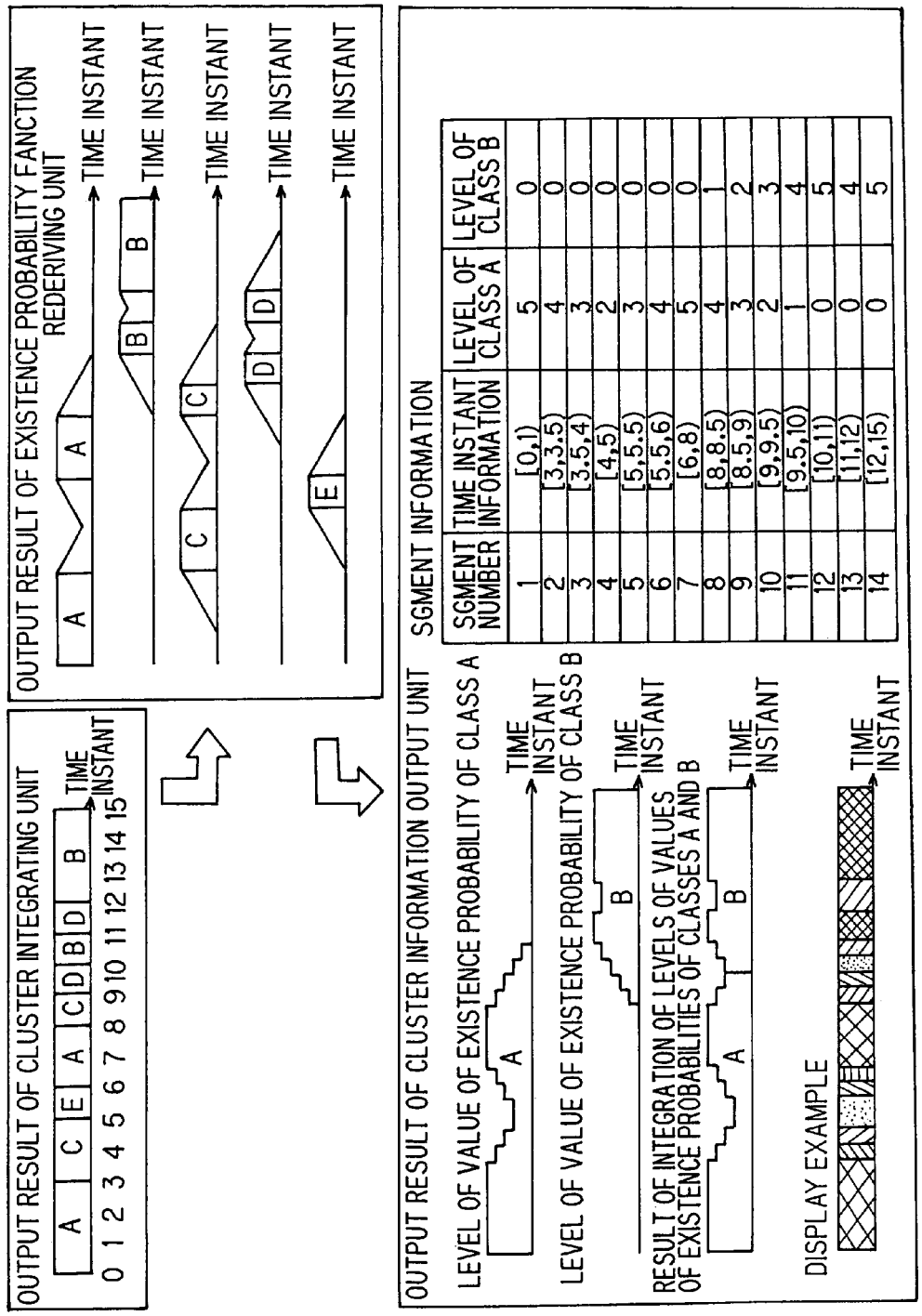
FIG. 20 is an example of operation relating to the output result of the cluster information output unit.
Figure 21:
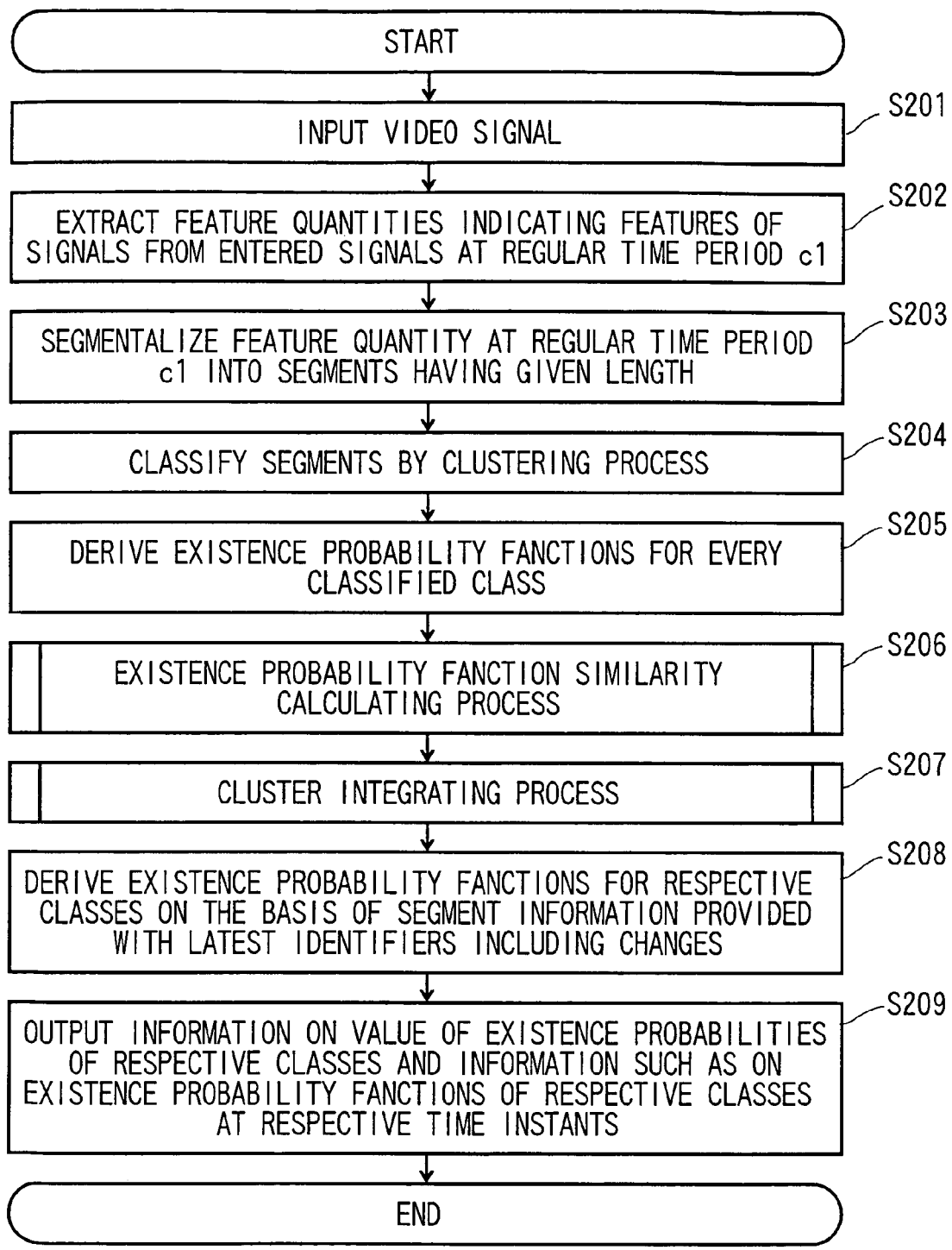
FIG. 21 is a flowchart showing a procedure of a process carried out by the signal processing apparatus.

Referring now to FIGS. 19 to 21, the signal processing apparatus 100 according to a second embodiment will be described. The same reference numerals are given to the same components as those in the first embodiment, and description will be omitted.

(1) Configuration of Signal Processing Apparatus 100

FIG. 19 is a block diagram showing a functional configuration of the signal processing apparatus 100 according to the second embodiment.

As shown in FIG. 19, the signal processing apparatus 100 includes the feature quantity extracting unit 11, the segmentalizing unit 12, the clustering unit 13, the existence probability function deriving unit 14, the existence probability function similarity calculating unit 15, a cluster integrating unit 21, an existence probability function rederiving unit 22 and a cluster information output unit 23.

In FIG. 19, the cluster integrating unit 21, the existence probability function rederiving unit 22 and the cluster information output unit 23 are functional units implemented by the cooperation with predetermined programs stored in advance in the CPU 101 and the ROM 104 as in the case of the feature quantity extracting unit 11, the segmentalizing unit 12, the clustering unit 13, the existence probability function deriving unit 14 and the existence probability function similarity calculating unit 15.

(2) Cluster Integrating Unit 21

The cluster integrating unit 21 carries out a process to integrate information on a plurality of classes on the basis of the similarity table information entered by the existence probability function similarity calculating unit 15, and outputs newly obtained information on the classes to which the respective segments belong to the existence probability function rederiving unit 22.

(3) Existence Probability Function Rederiving Unit 22

The existence probability function rederiving unit 22 obtains existence functions for the respective classes on the basis of information on the respective segments having the latest identifiers including changes entered by the cluster integrating unit 21. Then, the existence probability function rederiving unit 22 derives the existence probability functions of the respective classes using the existence functions obtained newly, and outputs the latest segment information, the accumulated segment length information of the respective classes and the information on the existence probability functions of the respective class to the cluster information output unit 23.

(4) Cluster Information Output Unit 23

The cluster information output unit 23 outputs information on the values of the existence probability for the respective classes at respective time instants from the output result and information on the accumulated segment lengths and the number of segments for the respective classes from the output result of the existence probability function rederiving unit 22. FIG. 20 shows examples of the output result of the cluster integrating unit 21, the output result of the existence probability function rederiving unit 22 and the output result of the cluster information output unit 23.

Here, the cluster information output unit 23 is able to output the value level of the existence probability and start and end time instants of the segments for the respective classes of the respective segments prepared by integrating the time instants in the same level by recording the existence probability in the form (level) of L stages such as Level "0" when the value g of the existence probability is "0", and Level "1" when the relation 0<g<0.25 is satisfied.

When assuming a display state in which the color is changed with the class to which the segment displayed on the time bar belongs to, an upper limit Y of the number of available colors (classes) is set, and hence it is also possible to display in the color of the class having the highest level in each segment by changing the density according to the value level of the existence probability. In this case, the values of the existence probabilities of the classes to be recorded may be limited to the available classes. In the example in FIG. 21, the values of the existence probabilities are classified into five levels (L=5, as regards the value g of the existence probability; Level 0 when g=0, Level 1 when 0<g<0.25, Level 2 when $0.25<=g<0.5$, Level 3 when $0.5<=g<0.75$, Level 4 when $0.75<=g<1$, and Level 5 when g=1), and the upper limit Y of the number of available colors of the existence probabilities is "2".

(5) Content of Process

FIG. 21 is a flowchart showing a flow of a process carried out by the signal processing apparatus 100 in the second embodiment. Referring now to FIG. 21, the process in the second embodiment will be described.

In Step S201, a video signal is entered via the signal input unit 106.

Then, in Step S202, the feature quantity extracting unit 11 extracts the feature quantity which indicates the features of the signal from the entered signal at regular time periods c1. When the entered signal is the speech signal, the speech feature quantity indicating the speaker's property is extracted and, when the entered signal is the video image signal, the image feature quantity such as the histogram of the shooting object is extracted. In this case, the extracted feature quantity is outputted by the feature quantity extracting unit 11 to the segmentalizing unit 12.

Then, in Step S203, the segmentalizing unit 12 segmentalizes the entered feature quantity into segments having a given length. The segmentalization may be carried out at regular time intervals c6 or at the points which exhibit minimum change of the speech feature quantity or the image feature quantity on the time series. Here, information on the start and end time instants corresponding to the segmentalized feature quantity is outputted to the clustering unit 13.

Then, in Step S204, the clustering unit 13 puts the similar segments into one cluster (class) by finding the similarity among the feature quantities of the segments and classifying on the basis of the similarity. In this step, the identifiers are provided to the respective classes for discriminating the same from each other, and information on the respective segments to which the identifiers are provided is outputted to the existence probability function deriving unit 14.

Then, in Step S205, the existence probability function deriving unit 14 derives the existence probability functions for the classified classes respectively on the basis of the existence states in the segments which belong to the corresponding class. In this step, the derived existence probability functions are outputted to the existence probability function similarity calculating unit 15.

Then, in Step S206, a similarity table of the existence probability functions for all the combinations of the classes is prepared by the existence probability function similarity calculating process. The existence probability function similarity calculating unit 15 outputs the information on segments to which the class identifiers are provided and the obtained information of the similarity table to the cluster integrating unit 21.

Then, in Step S207, the cluster integrating unit 21 provides the same identifier to the classes having the existence probability functions with high level of similarity by the cluster integrating process. The cluster integrating unit 21 outputs the information on the respective segments having the latest identifiers including changes to the existence probability function rederiving unit 22.

Then, in Step S208, the existence probability function rederiving unit 22 derives the existence probability functions for the respective classes on the basis of the latest information on the segments and outputs the information on the existence probability functions to the cluster information output unit 23.

Finally, in the Step S209, the cluster information output unit 23 records the values of the existence probabilities for the respective classes at the respective time instants and the information on the existence probability functions for the respective classes, and the process is ended.

(6) Effect

As described above, according to the second embodiment, in particular, when the upper limit of the number of classes to show the results is set, the information on the segments which cannot be outputted originally is presented by presenting the class information having the value of the existence probability function.

Therefore, assuming that the existence of the corner boundaries are confirmed by the change of the tendency of appeared classes, the continuity of the corners may also be implied by the existence probability according to the second embodiment.

[Modifications]

Although the embodiments of the invention have been described thus far, the invention is not limited thereto, and various types of modifications, replacements and additions are possible without departing the scope of the invention.

What is claimed is:

1. A signal processing apparatus comprising:
a processor; and
a memory to store computer-executable instructions which, when executed, cause the processor to:
segment a signal feature quantity, which corresponds to a feature of a content signal comprising audio and/or video, into segments having a given time length;
cluster the segments into classes on the basis of similarity among signal feature quantities of the respective segments;
generate existence probability functions indicating probabilities that respective segments exist with respect to an elapsed time period of the content signal for segments belonging to the respective classes;
calculate similarities among the existence probability functions for the respective classes;
obtain integrated classes by integrating classes having existence probability functions with a level of similarity greater than a threshold similarity level; and
output identification information of the integrated classes to which the respective segments belong.

2. The apparatus according to claim 1, wherein the content signal is a speech signal including speech of a plurality of speakers, and the signal feature quantity is a speech feature quantity indicating features of the speech signal.

3. The apparatus according to claim 1, wherein the content signal is a video image signal including a plurality of video images, and the signal feature quantity is an image feature quantity indicating features of the video image signal.

4. The apparatus according to claim 1, wherein the computer-executable instructions, when executed, cause the processor to segment the signal feature quantity at regular time periods.

5. The apparatus according to claim 1, wherein the computer-executable instructions, when executed, cause the processor to segment the signal feature quantity at time instants having a fluctuation of the signal feature quantity.

6. The apparatus according to claim 1, wherein the existence probability functions are a cluster of individual existence probability functions for the respective segments, and
wherein the individual existence probability functions are probability functions configured in such a manner that existence probability at a start time instant in an elapsed time of the content signal in which appearance of the signal feature quantity is observed in the corresponding segment is assumed to be "1", and existence probability is reduced as time goes back to a past time instant from the start time instant.

7. The apparatus according to claim 6, wherein the computer-executable instructions, when executed, cause the processor to generate a rate of decrease of the existence probability as the time goes back to the past time instant from the start time instant on the basis of a time difference between the start time instant and an end time instant of the corresponding segment which is at the nearest past time instant.

8. The apparatus according to claim 1, wherein the existence probability functions are a cluster of individual existence probability functions for the respective segments, and
wherein the individual existence probability functions are probability functions configured in such a manner that existence probability at an end time instant in an elapsed time period of the content signal in which appearance of the signal feature quantity is observed in the corresponding segment is assumed to be "1" and existence probability is decreased as the time goes to a future time instant from the end time instant.

9. The apparatus according to claim 7, wherein the computer-executable instructions, when executed, cause the processor to generate a rate of decrease of the existence probability as the time goes to a future time instant from the end time instant on the basis of a time difference between the end time instant and a start time instant of the corresponding segment which is at the nearest future time instant.

10. The apparatus according to claim 1, wherein the computer-executable instructions, when executed, cause the processor to generate normal distributions which can be calculated from the values of existence probability functions observed in analytical windows having a given window width period for respective shift widths having a given shift width period, and derives the existence probability functions at respective time instants in the elapsed time period of the content signal by combinations of the normal distributions.

11. The apparatus according to claim 1, wherein the computer-executable instructions, when executed, cause the processor to output identification information of the integrated classes at every elapsed time period of the content signal.

12. The apparatus according to claim 1, wherein the computer-executable instructions, when executed, cause the processor to re-derive existence probability functions which indicate existence probability functions of the respective integrated classes,
and to output identification information of the classes in the respective segments on the basis of the re-derived existence probability functions.

13. The apparatus according to claim 1, wherein the computer-executable instructions, when executed, cause the processor to derive the existence probability functions for the respective integrated classes on the basis of the individual existence probability functions of the segments which belong to the same integrated class, determine output priority according to a total appearance time period of the integrated classes from among the integrated classes having existence probability larger than "0" at respective time instants in the elapsed time period of the content signal, and output the identification information of the integrated classes to which the segments belong and information of the existence probability functions.

14. The apparatus according to claim 1, wherein the computer-executable instructions, when executed, cause the processor to derive the existence probability functions for the respective integrated classes on the basis of the individual existence probability functions of the segments which belong to the same integrated class, determine output priority according to a level of existence probability from among the integrated classes having existence probability larger than "0" at respective time instants in the elapsed time period of the content signal, and output the identification information of the integrated classes to which the segments belong and information of the existence probability functions.

15. The apparatus according to claim 1, wherein the computer-executable instructions, when executed, cause the processor to derive the existence probability functions for the respective integrated classes on the basis of the individual existence probability functions of the segments which belong to the same integrated class, determine output priority according to whether or not observation of appearance is achieved from among the integrated classes having existence probability larger than "0" at respective time instants in the elapsed time period of the content signal, and output the identification information of the integrated classes to which the segments belong and information of the existence probability functions.

16. A signal processing method comprising:
segmenting a signal feature quantity, which corresponds to a feature of a content signal comprising audio and/or video, into segments having a given time length;
clustering the segments into classes on the basis of similarity among the signal feature quantities of the respective segments;
generating existence probability functions indicating probabilities that respective segments exist with respect to an elapsed time period of the content signal for segments belonging to the respective classes;
calculating, using a processor, similarities among existence probability functions for the respective classes;
obtaining integrated classes by integrating classes having existence probability functions with a level of similarity greater than a threshold similarity level; and
outputting identification information of the integrated classes to which the respective segments belong.

17. A program stored in a non-transitory computer readable medium, the program comprising instructions which, when executed, cause a computer to:
segment a signal feature quantity, which corresponds to a feature of a content signal comprising audio and/or video, into segments having a given length;
cluster the segments into classes on the basis of similarity among signal feature quantities of the respective segments;
generate existence probability functions indicating probabilities that respective segments exist with respect to an elapsed time period of the content signal for segments belonging to the respective classes;
calculate similarities among existence probability functions for the respective classes;
obtain integrated classes by integrating classes having existence probability functions with a level of similarity greater than a threshold similarity level; and
output identification information of the integrated classes to which the respective segments belong.

* * * * *